United States Patent
Gudem et al.

(10) Patent No.: US 9,172,402 B2
(45) Date of Patent: Oct. 27, 2015

(54) MULTIPLE-INPUT AND MULTIPLE-OUTPUT CARRIER AGGREGATION RECEIVER REUSE ARCHITECTURE

(75) Inventors: Prasad Srinivasa Siva Gudem, San Diego, CA (US); Xiaoyin He, San Diego, CA (US); Tamer Adel Kadous, San Diego, CA (US); Li-Chung Chang, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/411,467

(22) Filed: Mar. 2, 2012

(65) Prior Publication Data

US 2013/0230080 A1    Sep. 5, 2013

(51) Int. Cl.
*H04B 1/00* (2006.01)
*H04B 1/525* (2015.01)
*H04B 7/04* (2006.01)

(52) U.S. Cl.
CPC ............ *H04B 1/0057* (2013.01); *H04B 1/0064* (2013.01); *H04B 1/525* (2013.01); *H04B 7/0413* (2013.01)

(58) Field of Classification Search
CPC ...... H04B 7/0413; H04B 1/0057; H04B 1/38; H04L 5/001; H04W 72/04
USPC ......... 375/219, 260, 267, 295, 299, 316, 347, 375/340; 455/101, 132, 500, 562.1; 370/334, 464, 480
See application file for complete search history.

(56) References Cited

U.S. PATENT DOCUMENTS 3,911,364 A    10/1975    Langseth et al.
4,035,728 A    7/1977    Ishikawa et al.
(Continued)

FOREIGN PATENT DOCUMENTS

CN    1523912 A    8/2004
CN    1922795 A    2/2007
(Continued)

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.
(Continued)

Primary Examiner — Leon Flores
(74) Attorney, Agent, or Firm — James Gutierrez

(57) ABSTRACT

A wireless communication device configured for receiving a wireless multiple-input and multiple-output signal. The wireless communication device includes a first multiple-input and multiple-output carrier aggregation receiver reuse architecture. The first multiple-input and multiple-output carrier aggregation receiver reuse architecture includes a first antenna, a second antenna and a transceiver chip. The first multiple-input and multiple-output carrier aggregation receiver reuse architecture reuses a first carrier aggregation receiver path. The wireless communication device also includes a second multiple-input and multiple-output carrier aggregation receiver reuse architecture. The second multiple-input and multiple-output carrier aggregation receiver reuse architecture includes a third antenna, a fourth antenna and a receiver chip. The second multiple-input and multiple-output carrier aggregation receiver reuse architecture reuses a second carrier aggregation receiver path.

31 Claims, 9 Drawing Sheets

(56) References Cited

U.S. PATENT DOCUMENTS

| | | | |
|---|---|---|---|
| 4,035,729 A | 7/1977 | Perry | |
| 4,246,655 A | 1/1981 | Parker | |
| 4,326,294 A | 4/1982 | Okamoto et al. | |
| 4,715,048 A | 12/1987 | Masamura | |
| 4,742,563 A | 5/1988 | Fukumura | |
| 4,756,023 A | 7/1988 | Kojima | |
| 4,969,207 A | 11/1990 | Sakamoto et al. | |
| 5,056,411 A | 10/1991 | Baker | |
| 5,128,630 A | 7/1992 | Mijuskovic | |
| 5,291,519 A | 3/1994 | Tsurumaru | |
| 5,321,850 A | 6/1994 | Backstrom et al. | |
| 5,345,601 A | 9/1994 | Takagi et al. | |
| 5,390,342 A | 2/1995 | Takayama et al. | |
| 5,559,838 A | 9/1996 | Nakagoshi | |
| 5,566,364 A | 10/1996 | Mizoguchi et al. | |
| 5,694,396 A | 12/1997 | Firouzbakht et al. | |
| 5,697,083 A | 12/1997 | Sano | |
| 5,761,613 A | 6/1998 | Saunders et al. | |
| 5,794,159 A | 8/1998 | Portin | |
| 5,805,643 A | 9/1998 | Seki et al. | |
| 5,805,989 A | 9/1998 | Ushida | |
| 5,835,853 A | 11/1998 | Enoki et al. | |
| 5,940,452 A | 8/1999 | Rich | |
| 5,999,815 A | 12/1999 | Tenbrook et al. | |
| 5,999,990 A | 12/1999 | Sharrit et al. | |
| 6,026,288 A | 2/2000 | Bronner | |
| 6,040,732 A | 3/2000 | Brokaw | |
| 6,044,254 A | 3/2000 | Ohta et al. | |
| 6,063,961 A | 5/2000 | Kroner | |
| 6,069,923 A | 5/2000 | Ostman et al. | |
| 6,088,348 A | 7/2000 | Bell, III et al. | |
| 6,208,844 B1 | 3/2001 | Abdelgany | |
| 6,249,687 B1 | 6/2001 | Thomsen et al. | |
| 6,407,689 B1 | 6/2002 | Bazarjani et al. | |
| 6,424,683 B1 | 7/2002 | Schoellhorn | |
| 6,430,237 B1 | 8/2002 | Anvari | |
| 6,472,947 B1 | 10/2002 | Zeitz | |
| 6,473,601 B1 | 10/2002 | Oda | |
| 6,522,895 B1 | 2/2003 | Montalvo | |
| 6,535,725 B2 | 3/2003 | Hatcher et al. | |
| 6,600,759 B1 | 7/2003 | Wood | |
| 6,600,907 B1 | 7/2003 | Taguchi | |
| 6,600,931 B2 | 7/2003 | Sutton et al. | |
| 6,657,498 B2 | 12/2003 | Park et al. | |
| 6,806,777 B2 | 10/2004 | Franca-Neto | |
| 6,819,941 B2 | 11/2004 | Dening et al. | |
| 6,888,888 B1 | 5/2005 | Tu et al. | |
| 6,952,594 B2 | 10/2005 | Hendin | |
| 6,954,446 B2 | 10/2005 | Kuffner | |
| 6,983,132 B2 | 1/2006 | Woo et al. | |
| 6,985,712 B2 | 1/2006 | Yamakawa et al. | |
| 6,987,950 B2 | 1/2006 | Coan | |
| 7,013,166 B2 | 3/2006 | Clifford | |
| 7,023,272 B2 | 4/2006 | Hung et al. | |
| 7,024,172 B1 | 4/2006 | Murphy et al. | |
| 7,039,377 B2 | 5/2006 | Yates | |
| 7,123,891 B2 | 10/2006 | Loke | |
| 7,142,042 B1 | 11/2006 | Henry | |
| 7,161,423 B2 | 1/2007 | Paul et al. | |
| 7,167,044 B2 | 1/2007 | Zhenbiao et al. | |
| 7,187,239 B2 | 3/2007 | Yeh | |
| 7,187,735 B2 | 3/2007 | Kent, III | |
| 7,187,904 B2 | 3/2007 | Gainey et al. | |
| 7,212,788 B2 | 5/2007 | Weber et al. | |
| 7,224,231 B2 | 5/2007 | Wu | |
| 7,260,377 B2 | 8/2007 | Burns et al. | |
| 7,283,851 B2 | 10/2007 | Persico et al. | |
| 7,299,021 B2 | 11/2007 | Pärssinen et al. | |
| 7,313,368 B2 | 12/2007 | Wu et al. | |
| 7,317,894 B2 | 1/2008 | Hirose | |
| 7,333,831 B2 | 2/2008 | Srinivasan et al. | |
| 7,356,325 B2 * | 4/2008 | Behzad et al. | 455/323 |
| 7,372,336 B2 | 5/2008 | Lee et al. | |
| 7,403,508 B1 | 7/2008 | Miao | |
| 7,444,166 B2 | 10/2008 | Sahota | |
| 7,454,181 B2 | 11/2008 | Banister et al. | |
| 7,477,106 B2 | 1/2009 | Van Bezooijen et al. | |
| 7,486,135 B2 | 2/2009 | Mu | |
| 7,570,111 B1 | 8/2009 | Vagher et al. | |
| 7,599,675 B2 | 10/2009 | Mu et al. | |
| 7,643,847 B2 | 1/2010 | Daanen et al. | |
| 7,643,848 B2 | 1/2010 | Robinett | |
| 7,697,905 B2 | 4/2010 | Lee et al. | |
| 7,728,664 B2 | 6/2010 | Chang et al. | |
| 7,751,513 B2 | 7/2010 | Eisenhut et al. | |
| 7,764,726 B2 | 7/2010 | Simic et al. | |
| 7,848,724 B2 | 12/2010 | Bult et al. | |
| 7,869,528 B2 | 1/2011 | Robinson | |
| 7,877,075 B1 | 1/2011 | Jin et al. | |
| 7,911,269 B2 | 3/2011 | Yang et al. | |
| 7,944,298 B2 | 5/2011 | Cabanillas et al. | |
| 7,949,309 B2 | 5/2011 | Rofougaran et al. | |
| 7,952,398 B2 | 5/2011 | Salcido et al. | |
| 8,022,772 B2 | 9/2011 | Cassia et al. | |
| 8,055,229 B2 | 11/2011 | Huang | |
| 8,063,706 B2 | 11/2011 | Li et al. | |
| 8,081,672 B2 | 12/2011 | Kent et al. | |
| 8,090,332 B2 | 1/2012 | Sahota et al. | |
| 8,090,369 B2 | 1/2012 | Kitazoe | |
| 8,139,670 B1 * | 3/2012 | Son et al. | 375/267 |
| 8,149,955 B2 | 4/2012 | Tired | |
| 8,195,117 B2 | 6/2012 | Bult et al. | |
| 8,208,887 B2 | 6/2012 | Lee et al. | |
| 8,217,723 B2 | 7/2012 | Rajendran et al. | |
| 8,242,841 B2 | 8/2012 | Zhang | |
| 8,270,927 B2 | 9/2012 | Wallace et al. | |
| 8,290,449 B2 | 10/2012 | Keehr et al. | |
| 8,295,778 B2 | 10/2012 | Kotecha et al. | |
| 8,306,494 B2 | 11/2012 | Ojo | |
| 8,442,473 B1 | 5/2013 | Kaukovuori et al. | |
| 8,514,015 B2 | 8/2013 | Chen | |
| 8,571,510 B2 | 10/2013 | Liu et al. | |
| 8,600,315 B2 | 12/2013 | Roufoogaran et al. | |
| 8,626,084 B2 | 1/2014 | Chan et al. | |
| 8,676,148 B2 | 3/2014 | Ogasawara | |
| 8,706,069 B2 | 4/2014 | Khoini-Poorfard et al. | |
| 2002/0008575 A1 | 1/2002 | Oskowsky et al. | |
| 2002/0061773 A1 | 5/2002 | Adachi et al. | |
| 2002/0111163 A1 | 8/2002 | Hamabe | |
| 2002/0132597 A1 | 9/2002 | Peterzell et al. | |
| 2002/0173337 A1 | 11/2002 | Hajimiri et al. | |
| 2002/0193108 A1 | 12/2002 | Robinett | |
| 2003/0076797 A1 | 4/2003 | Lozano | |
| 2003/0081694 A1 | 5/2003 | Wieck | |
| 2003/0125040 A1 | 7/2003 | Walton et al. | |
| 2003/0148750 A1 | 8/2003 | Yan et al. | |
| 2003/0157915 A1 | 8/2003 | Atkinson et al. | |
| 2003/0176176 A1 | 9/2003 | Leinonen et al. | |
| 2003/0203743 A1 | 10/2003 | Sugar et al. | |
| 2003/0206076 A1 | 11/2003 | Hashemi et al. | |
| 2003/0228851 A1 | 12/2003 | Taniguchi | |
| 2004/0087290 A1 | 5/2004 | Schmidt et al. | |
| 2004/0092243 A1 | 5/2004 | Hey-Shipton | |
| 2004/0113746 A1 | 6/2004 | Brindle | |
| 2004/0116086 A1 | 6/2004 | Huttunen | |
| 2004/0121753 A1 | 6/2004 | Sugar et al. | |
| 2004/0204104 A1 | 10/2004 | Horng et al. | |
| 2004/0219959 A1 | 11/2004 | Khayrallah et al. | |
| 2004/0224643 A1 | 11/2004 | Nakai | |
| 2004/0253955 A1 | 12/2004 | Love et al. | |
| 2004/0266356 A1 | 12/2004 | Javor et al. | |
| 2005/0039060 A1 | 2/2005 | Okayasu | |
| 2005/0075077 A1 | 4/2005 | Mach et al. | |
| 2005/0079847 A1 | 4/2005 | Arafa | |
| 2005/0118977 A1 | 6/2005 | Drogi et al. | |
| 2005/0197090 A1 | 9/2005 | Stockstad et al. | |
| 2005/0215264 A1 | 9/2005 | Subramaniam et al. | |
| 2005/0265084 A1 | 12/2005 | Choi | |
| 2005/0277387 A1 | 12/2005 | Kojima et al. | |
| 2006/0009177 A1 | 1/2006 | Persico et al. | |
| 2006/0023745 A1 | 2/2006 | Koo et al. | |
| 2006/0061773 A1 | 3/2006 | Lee et al. | |
| 2006/0121937 A1 | 6/2006 | Son | |
| 2006/0128322 A1 | 6/2006 | Igarashi et al. | |

(56) References Cited

U.S. PATENT DOCUMENTS

| | | |
|---|---|---|
| 2006/0146693 A1 | 7/2006 | Mori et al. |
| 2006/0189286 A1 | 8/2006 | Kyu et al. |
| 2006/0222100 A1 | 10/2006 | Behzad |
| 2006/0234662 A1 | 10/2006 | Diloisy |
| 2006/0291428 A1 | 12/2006 | Filipovic |
| 2007/0049332 A1 | 3/2007 | Higuchi |
| 2007/0060080 A1 | 3/2007 | Nishimura et al. |
| 2007/0072577 A1 | 3/2007 | Rozenblit et al. |
| 2007/0105517 A1 | 5/2007 | Chang et al. |
| 2007/0142013 A1 | 6/2007 | Bucknor et al. |
| 2007/0177656 A1 | 8/2007 | Maruta et al. |
| 2007/0177693 A1 | 8/2007 | Kluge |
| 2007/0184801 A1 | 8/2007 | Kogawa et al. |
| 2007/0197170 A1 | 8/2007 | Boos |
| 2007/0197178 A1 | 8/2007 | Gu |
| 2007/0197204 A1 | 8/2007 | Herczog et al. |
| 2007/0202890 A1 | 8/2007 | Feher |
| 2007/0242784 A1 | 10/2007 | Sampson et al. |
| 2007/0243832 A1 | 10/2007 | Park et al. |
| 2007/0262817 A1 | 11/2007 | Ciccarelli et al. |
| 2007/0262871 A1 | 11/2007 | Yamagajo et al. |
| 2008/0004078 A1 | 1/2008 | Barratt et al. |
| 2008/0013654 A1 | 1/2008 | Rick et al. |
| 2008/0117999 A1 | 5/2008 | Kadous et al. |
| 2008/0139151 A1 | 6/2008 | Ojo et al. |
| 2008/0204148 A1 | 8/2008 | Kim et al. |
| 2008/0224770 A1 | 9/2008 | Kim et al. |
| 2008/0224791 A1 | 9/2008 | Cheng |
| 2008/0225971 A1 | 9/2008 | Behzad |
| 2008/0261650 A1 | 10/2008 | Piriyapoksombut et al. |
| 2009/0124227 A1 | 5/2009 | Ishiguro |
| 2009/0227214 A1 | 9/2009 | Georgantas et al. |
| 2009/0237161 A1 | 9/2009 | Fagg |
| 2009/0243869 A1 | 10/2009 | Sanderford, Jr. |
| 2009/0253456 A1 | 10/2009 | Toh et al. |
| 2009/0290659 A1 | 11/2009 | Petrovic et al. |
| 2009/0323779 A1 | 12/2009 | Lennen |
| 2010/0019970 A1 | 1/2010 | Farrokhi et al. |
| 2010/0034094 A1 | 2/2010 | Tenny |
| 2010/0040178 A1 | 2/2010 | Sutton et al. |
| 2010/0142440 A1 | 6/2010 | Inoue |
| 2010/0195754 A1 | 8/2010 | Li et al. |
| 2010/0197263 A1 | 8/2010 | Dwyer et al. |
| 2010/0210226 A1 | 8/2010 | Matsuyama |
| 2010/0210272 A1 | 8/2010 | Sundstrm et al. |
| 2010/0210299 A1 | 8/2010 | Gorbachov |
| 2010/0214184 A1 | 8/2010 | Tran et al. |
| 2010/0225414 A1 | 9/2010 | Gorbachov |
| 2010/0226327 A1 | 9/2010 | Zhang et al. |
| 2010/0232493 A1 | 9/2010 | Thirumoorthy |
| 2010/0237947 A1 | 9/2010 | Xiong et al. |
| 2010/0253435 A1 | 10/2010 | Ichitsubo et al. |
| 2010/0265875 A1 | 10/2010 | Zhao et al. |
| 2010/0271986 A1 | 10/2010 | Chen |
| 2010/0272051 A1 | 10/2010 | Fu et al. |
| 2010/0301946 A1 | 12/2010 | Borremans |
| 2010/0311378 A1 | 12/2010 | Tasic et al. |
| 2010/0328155 A1 | 12/2010 | Simic et al. |
| 2010/0330977 A1 | 12/2010 | Kadous et al. |
| 2011/0018635 A1 | 1/2011 | Tasic et al. |
| 2011/0044380 A1 | 2/2011 | Marra et al. |
| 2011/0050319 A1 | 3/2011 | Wong |
| 2011/0084791 A1 | 4/2011 | Mun et al. |
| 2011/0086603 A1 | 4/2011 | Toosi et al. |
| 2011/0110463 A1 | 5/2011 | Chang et al. |
| 2011/0122972 A1 | 5/2011 | Lie et al. |
| 2011/0165848 A1 | 7/2011 | Gorbachov et al. |
| 2011/0193625 A1 | 8/2011 | Gatta et al. |
| 2011/0194504 A1 | 8/2011 | Gorokhov et al. |
| 2011/0204973 A1 | 8/2011 | Hu et al. |
| 2011/0211533 A1 | 9/2011 | Casaccia et al. |
| 2011/0217945 A1 | 9/2011 | Uehara et al. |
| 2011/0222443 A1 | 9/2011 | Khlat |
| 2011/0222444 A1 | 9/2011 | Khlat et al. |
| 2011/0242999 A1 | 10/2011 | Palanki et al. |
| 2011/0250926 A1 | 10/2011 | Wietfeldt et al. |
| 2011/0268048 A1 | 11/2011 | Toskala et al. |
| 2011/0268232 A1 | 11/2011 | Park et al. |
| 2011/0292844 A1 | 12/2011 | Kwun et al. |
| 2011/0299434 A1 | 12/2011 | Gudem et al. |
| 2011/0300810 A1 | 12/2011 | Mikhemar et al. |
| 2012/0009886 A1 | 1/2012 | Poulin |
| 2012/0013387 A1 | 1/2012 | Sankaranarayanan et al. |
| 2012/0026862 A1 | 2/2012 | Sadri et al. |
| 2012/0044927 A1 | 2/2012 | Pan et al. |
| 2012/0056681 A1 | 3/2012 | Lee |
| 2012/0057621 A1 | 3/2012 | Hong et al. |
| 2012/0195237 A1 | 8/2012 | Chan et al. |
| 2012/0236829 A1 | 9/2012 | Takano et al. |
| 2012/0293265 A1 | 11/2012 | Heikkinen et al. |
| 2012/0294299 A1 | 11/2012 | Fernando |
| 2012/0327825 A1 | 12/2012 | Gudem et al. |
| 2012/0329395 A1 | 12/2012 | Husted et al. |
| 2013/0003617 A1 | 1/2013 | Gudem et al. |
| 2013/0003783 A1 | 1/2013 | Gudem et al. |
| 2013/0043946 A1 | 2/2013 | Hadjichristos et al. |
| 2013/0051284 A1 | 2/2013 | Khlat |
| 2013/0114769 A1 | 5/2013 | Fernando |
| 2013/0163492 A1 | 6/2013 | Wong |
| 2013/0217398 A1* | 8/2013 | Winiecki et al. ............... 455/450 |
| 2013/0231064 A1 | 9/2013 | Gudem et al. |
| 2013/0265892 A1 | 10/2013 | Fernando |
| 2013/0315348 A1 | 11/2013 | Tasic et al. |
| 2013/0316668 A1 | 11/2013 | Davierwalla et al. |
| 2013/0316669 A1 | 11/2013 | Davierwalla et al. |
| 2013/0316670 A1 | 11/2013 | Tasic et al. |
| 2013/0329665 A1 | 12/2013 | Kadous et al. |
| 2014/0072001 A1 | 3/2014 | Chang et al. |
| 2014/0113578 A1 | 4/2014 | Xu |
| 2014/0269853 A1 | 9/2014 | Gudem et al. |

FOREIGN PATENT DOCUMENTS

| | | |
|---|---|---|
| CN | 101228702 A | 7/2008 |
| CN | 101242158 A | 8/2008 |
| CN | 101523967 A | 9/2009 |
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |
| JP | 2007324711 A | 12/2007 |
| JP | 2008085793 A | 4/2008 |
| JP | 2008519535 A | 6/2008 |
| JP | 2009027778 | 2/2009 |
| JP | 2009130867 A | 6/2009 |
| JP | 2011015112 A | 1/2011 |
| JP | 2011082669 A | 4/2011 |
| JP | 2011091747 A | 5/2011 |
| JP | 2011119807 A | 6/2011 |
| WO | WO0150636 | 7/2001 |
| WO | 0237686 | 5/2002 |
| WO | WO2005039060 | 4/2005 |
| WO | 2005062477 A2 | 7/2005 |

(56) References Cited

FOREIGN PATENT DOCUMENTS

| WO | WO2005064816 A1 | 7/2005 |
|---|---|---|
| WO | 2005088847 A1 | 9/2005 |
| WO | 2006050515 A2 | 5/2006 |
| WO | 2006118538 A2 | 11/2006 |
| WO | 2008059257 A1 | 5/2008 |
| WO | 2008084539 A1 | 7/2008 |
| WO | 08103757 | 8/2008 |
| WO | 2008092745 A1 | 8/2008 |
| WO | 2008145604 A1 | 12/2008 |
| WO | 2010059257 A1 | 5/2010 |
| WO | 2011019850 A1 | 2/2011 |
| WO | 2011050729 A1 | 5/2011 |
| WO | 2011092005 A1 | 8/2011 |
| WO | 2011138697 A1 | 11/2011 |
| WO | 2012008705 A2 | 1/2012 |
| WO | 2012049529 A1 | 4/2012 |
| WO | 2012158976 A1 | 11/2012 |
| WO | 2013036794 A1 | 3/2013 |
| WO | 2013131047 | 9/2013 |

OTHER PUBLICATIONS

Hwang, et al., "A High IIP2 Direct-Conversion Receiver using Even-Harmonic Reduction Technique for Cellular CDMA/PCS/GPS applications," IEEE Transaction on Circuits and Systems.

MSM6000 Chipset Solution, Qualcomm Incorporated.

MSM6500 Chipset Solution, Qualcomm Incorporated.

Sever et al. "A Dual-Antenna Phase-Array Ultra-Wideband CMOS Transceiver". IEEE Communications Magazine [Online] 2006, vol. 44, Issue 8, pp. 102-110. See pp. 104-107.

Winternitz, et al., "A GPS Receiver for High-Altitude Satellite Navigation," IEEE Journal of Selected Topics in Signal Processing, vol. 3, No. 4, pp. 541-556, Aug. 2009.

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

Broyde F., et al., "The Noise Performance of a Multiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.

Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.

Chen, et al., "A monolithic 5.9-GHz CMOS I/Q direct-down converter utilizing a quadrature coupler and transformer-coupled subharmonic mixers," Microwave and Wireless Components Letters, IEEE , vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.

Hashemi, et al., "Concurrent Multiband Low-Noise Amplifiers—Theory, Design, and Applications," IEEE Transactions on Microwave Theory and Techniques, vol. 50, No. 1, Jan. 2002.

Henrik M et al., "A Full Duplex Front End Module for WiFi 802.11.n Applications", European Microwave Association, vol. 12, No. 4, Oct. 2008, pp. 162-165.

International Search Report and Written Opinion—PCT/US2013/028737—ISA/EPO—Jul. 5, 2013.

Jones W. W., et al., "Narrowband interference suppression using filter-bank analysis/synthesis techniques", Military Communications Conference, 1992. Milcom '92, Conference Recor D. Communications—Fusing Command, Control and Intelligence., IEEE San Diego, CA, USA, 11 14 Oct. 1992, New York, NY, USA, IEEE, US, Oct. 11, 1992, pp. 898-902, XP010060840, DOI: 10.1109/MILCOM.1992.243977, ISBN: 978-0-7803-0585-4.

Jussi R et al., "A Dual-Band RF Front-End for WCDMA and GSM Applications", IEEE, Journal Solid-State Circuits, 2001, vol. 36, No. 8, pp. 1198-1204.

Kevin W et al., "3G/4G Multimode Cellular Front End Challenges", Part 2: Architecture Discussion, RFMD® White Paper, 9 pages.

Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.

Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

Lee et al., "Development of Miniature Quad SAW filter bank based on PCB substrate", IEEE Intl Frequency Control Symp, pp. 146-149, 2007.

Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.

Qualcomm Europe: "UE Implementation Impact due to 4C-HSDPA Operation", 3GPP Draft; R1-094067_UE_IMPL_IMPACT_4C_HSDPA, 3RD Generation Partnership Project (3GPP), Mobile Competence Centre; 650, Route Des Lucioles ; F-06921 Sophia-Antipolis Cedex ; France, No. Miyazaki; Oct. 12, 2009, XP050388547, [retrieved on Oct. 6, 2009].

Rahn D.G., et al., "A fully integrated multiband MIMO WLAN transceiver RFIC," IEEE J. Solid-State Circuits, 2005, vol. 40 (8), 1629-1641.

Tasic A. et al., "Design of Adaptive Multimode RF Front-End Circuits", IEEE Journal of Solid-State Circuits, vol. 42, Issue 2, Feb. 2007 pp. 313-322.

"UMTS Picocell Front End Module", CTS Corp. 8 pages.

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, No. Dresden, Germany; 20100628, Jun. 22, 2010, XP050449298, [retrieved on Jun. 22, 2010] the whole document.

* cited by examiner

MULTIPLE-INPUT AND MULTIPLE-OUTPUT CARRIER AGGREGATION RECEIVER REUSE ARCHITECTURE

TECHNICAL FIELD

The present disclosure relates generally to wireless devices for communication systems. More specifically, the present disclosure relates to systems and methods for a multiple-input and multiple-output (MIMO) carrier aggregation receiver reuse architecture.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput has also increased. One such way to increase downlink throughput is the use of carrier aggregation. In carrier aggregation, multiple carriers may be aggregated on the physical layer to provide the required bandwidth (and thus the required throughput).

It may be desirable for an electronic device to maximize battery life. Because an electronic device often runs on a battery with a limited operation time, reductions in the power consumption of an electronic device may increase the desirability and functionality of the electronic device.

The electronic devices have also become smaller and cheaper. To facilitate both the decrease in size and the decrease in cost, additional circuitry and more complex circuitry are being used on integrated circuits. Thus, any reduction in the die area used by circuitry may reduce both the size and cost of an electronic device. Benefits may be realized by improvements to electronic devices that minimize the cost and size of the electronic device while also minimizing the power consumption of the electronic device.

SUMMARY

A wireless communication device configured for receiving a wireless multiple-input and multiple-output signal is described. The wireless communication device includes a first multiple-input and multiple-output carrier aggregation receiver reuse architecture. The first multiple-input and multiple-output carrier aggregation receiver reuse architecture includes a first antenna, a second antenna and a transceiver chip. The first multiple-input and multiple-output carrier aggregation receiver reuse architecture reuses a first carrier aggregation receiver path. The wireless communication device also includes a second multiple-input and multiple-output carrier aggregation receiver reuse architecture. The second multiple-input and multiple-output carrier aggregation receiver reuse architecture includes a third antenna, a fourth antenna and a receiver chip. The second multiple-input and multiple-output carrier aggregation receiver reuse architecture reuses a second carrier aggregation receiver path.

The wireless communication device may not require a power splitter, an external low noise amplifier or die-to-die signal routing. The transceiver chip may include a transmitter, first primary receiver and a first secondary receiver. The receiver chip may include a second primary receiver and a second secondary receiver. Each receiver may include multiple low noise amplifiers.

A first routing may be used from the first antenna through the first primary receiver to obtain a primary receive inphase/quadrature signal. A second routing may be used from the second antenna through the first secondary receiver to obtain a secondary receive inphase/quadrature signal. A third routing may be used from the third antenna through the second primary receiver to obtain a tertiary receive inphase/quadrature signal. A fourth routing may be used from the fourth antenna through the second secondary receiver to obtain a quaternary receive inphase/quadrature signal.

The first routing may pass through a duplexer and through a low noise amplifier on the first primary receiver. The second routing may pass through a surface acoustic wave filter and through a low noise amplifier on the first secondary receiver. The third routing may pass through a surface acoustic wave filter and through a low noise amplifier on the second primary receiver. The fourth routing may pass through a surface acoustic wave filter and through a low noise amplifier on the second secondary receiver.

Only two synthesizers may be running on the wireless communication device when the wireless communication device is receiving multiple-input and multiple-output communications. The first primary receiver may include a first synthesizer. The second primary receiver may include a second synthesizer. The first synthesizer may be shared with the first secondary receiver. The second synthesizer may be shared with the second secondary receiver.

The wireless communication device may be configured to receive 4Rx multiple-input and multiple-output communications using the first antenna, the second antenna, the third antenna and the fourth antenna. The second antenna may be a wireless local area network antenna. The fourth antenna may be a global positioning system antenna.

A method for receiving a multiple-input and multiple-output wireless signal is also described. A first multiple-input and multiple-output wireless signal is received using a first antenna. The first multiple-input and multiple-output wireless signal is routed through a first primary receiver on a transceiver chip to obtain a primary receive inphase/quadrature signal. A second multiple-input and multiple-output wireless signal is received using a second antenna. The second multiple-input and multiple-output wireless signal is routed through a first secondary receiver on the transceiver chip to obtain a secondary receive inphase/quadrature signal. A third multiple-input and multiple-output wireless signal is received using a third antenna. The third multiple-input and multiple-output wireless signal is routed through a second primary receiver on a receiver chip to obtain a tertiary receive inphase/quadrature signal. A fourth multiple-input and multiple-output wireless signal is received using a fourth antenna. The fourth multiple-input and multiple-output wireless signal is routed through a second secondary receiver on the receiver chip to obtain a quaternary receive inphase/quadrature signal.

A receive signal may be obtained from the primary receive inphase/quadrature signal, the secondary receive inphase/quadrature signal, the tertiary receive inphase/quadrature signal and the quaternary receive inphase/quadrature signal. The primary receive inphase/quadrature signal, the secondary receive inphase/quadrature signal, the tertiary receive inphase/quadrature signal and the quaternary receive inphase/quadrature signal may be passed through a baseband digital modem to obtain the receive signal. The method may be performed by a wireless communication device.

An apparatus for receiving a multiple-input and multiple-output wireless signal is described. The apparatus includes means for receiving a first multiple-input and multiple-output wireless signal. The apparatus also includes means for routing the first multiple-input and multiple-output wireless signal through a first primary receiver on a transceiver chip to obtain a primary receive inphase/quadrature signal. The apparatus further includes means for receiving a second multiple-input and multiple-output wireless signal. The apparatus also includes means for routing the second multiple-input and multiple-output wireless signal through a first secondary receiver on the transceiver chip to obtain a secondary receive inphase/quadrature signal. The apparatus further includes means for receiving a third multiple-input and multiple-output wireless signal. The apparatus also includes means for routing the third multiple-input and multiple-output wireless signal through a second primary receiver on a receiver chip to obtain a tertiary receive inphase/quadrature signal. The apparatus further includes means for receiving a fourth multiple-input and multiple-output wireless signal. The apparatus also includes means for routing the fourth multiple-input and multiple-output wireless signal through a second secondary receiver on the receiver chip to obtain a quaternary receive inphase/quadrature signal.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS $3^{rd}$ generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of $3^{rd}$ generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1× or 1×RTT refers to the core CDMA2000 wireless air interface standard. 1× more specifically refers to 1 times Radio Transmission Technology and indicates the same radio frequency (RF) bandwidth as used in IS-95. 1×RTT adds 64 additional traffic channels to the forward link. EV-DO refers to Evolution-Data Optimized. EV-DO is a telecommunications standard for the wireless transmission of data through radio signals.

Figure 1:
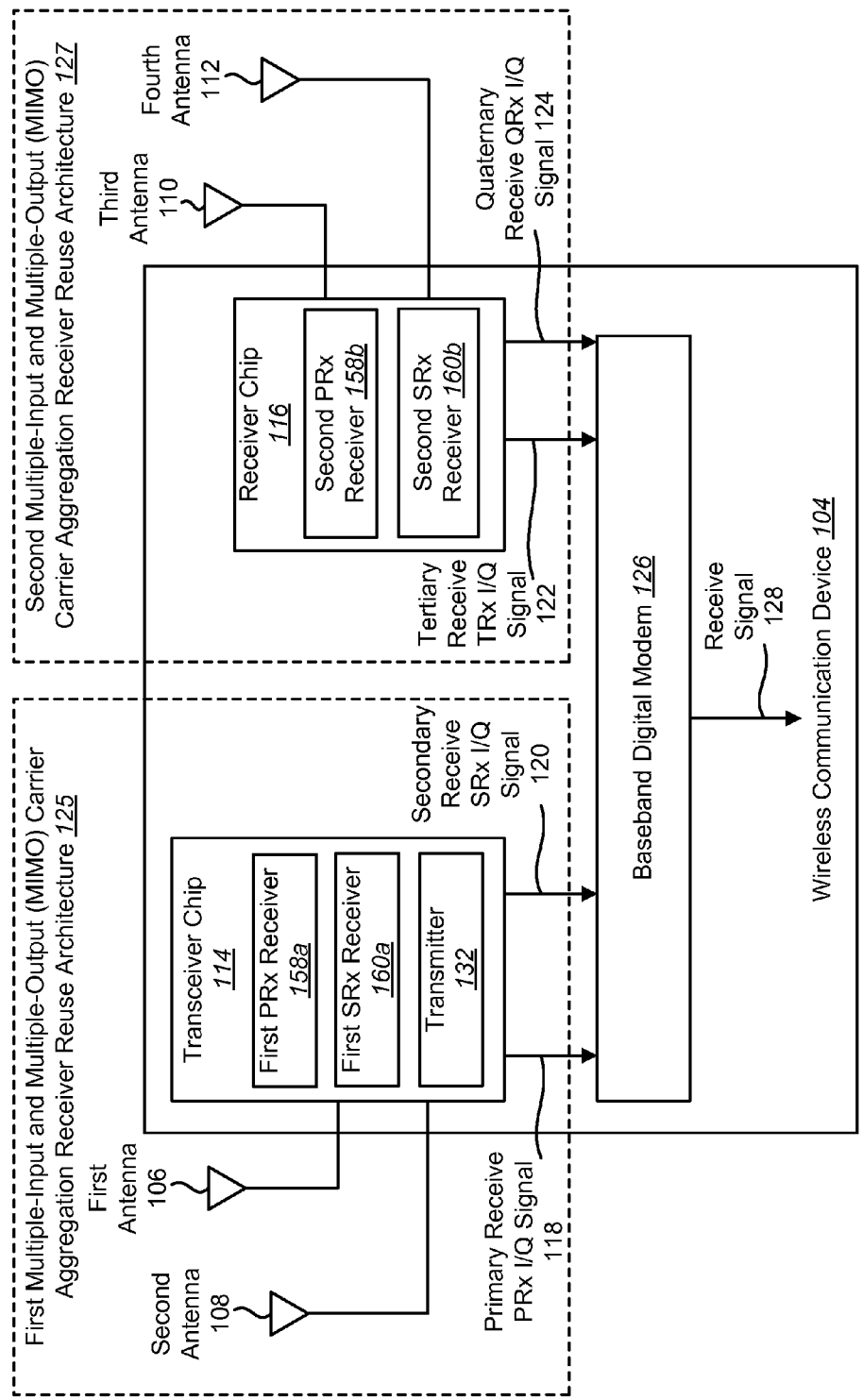
FIG. 1 shows a wireless communication device for use in the present systems and methods.

FIG. 1 shows a wireless communication device 104 for use in the present systems and methods. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a tablet computer, a PC card, compact flash, an external or internal modem, a wireline phone, etc. A wireless communication device 104 may be mobile or stationary. A wireless communication device 104 may communicate with zero, one or multiple base stations on a downlink and/or an uplink at any given moment. The downlink (or forward link) refers to the communication link from a base station to a wireless communication device 104, and the uplink (or reverse link) refers to the communication link from a wireless communication device 104 to a base station. Uplink and downlink may refer to the communication link or to the carriers used for the communication link.

A wireless communication device 104 may operate in a wireless communication system that includes other wireless devices, such as base stations. A base station is a station that communicates with one or more wireless communication devices 104. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices 104. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

As the demand for information by wireless communication devices 104 increases, the downlink throughput has also increased. One way to increase the downlink throughput is the use of carrier aggregation. In carrier aggregation, multiple carriers may be aggregated on the physical layer to provide the required bandwidth (and thus the required throughput). Carrier aggregation may use two antennas and four receivers. Typically, two of the receivers are on a first chip and two of the receivers are on a second chip. If the chips are reused for non-carrier aggregation, only two of the receivers may be used. However, the additional unused receivers (in non-carrier aggregation) may be used to support 4Rx paths. This may be accomplished by adding two additional antennae or by reusing the existing wireless local area network (WLAN) antenna and global positioning system (GPS) antenna.

The wireless communication device 104 may include a first antenna 106, a second antenna 108, a third antenna 110 and a fourth antenna 112. In one configuration, the first antenna 106 may be a primary antenna, the second antenna 108 may be a wireless local area network (WLAN) antenna or a Bluetooth antenna, the third antenna 110 may be a secondary antenna and the fourth antenna 112 may be a global positioning system (GPS) antenna.

A transceiver chip 114 on the wireless communication device 104 may be coupled to the first antenna 106 and the second antenna 108. The transceiver chip 114 may include a transmitter 132, a first PRx receiver 158a and a first SRx receiver 160a. In one configuration, the transceiver chip 114 may also include a wireless local area network (WLAN)/Bluetooth receiver (i.e., when the second antenna 108 is a wireless local area network (WLAN) antenna or a Bluetooth antenna). The first PRx receiver 158a may output a primary receive PRx inphase/quadrature (I/Q) signal 118 to a baseband digital modem 126 on the wireless communication device 104. The first SRx receiver 160a may output a secondary receive SRx inphase/quadrature (I/Q) signal 120 to the baseband digital modem 126. The configuration of the first antenna 106, the second antenna 108 and the transceiver chip 114 may be referred to as a first multiple-input and multiple-output (MIMO) carrier aggregation receiver reuse architecture 125. This is because the first multiple-input and multiple-output (MIMO) carrier aggregation receiver reuse architecture 125 may reuse a carrier aggregation receiver architecture on the wireless communication device 104 to support multiple-input and multiple-output (MIMO) communications (such as the 4Rx multiple-input and multiple-output (MIMO) shown).

A receiver chip 116 on the wireless communication device 104 may be coupled to the second antenna 108 and the third antenna 110. The receiver chip 116 may include a second PRx receiver 158b and a second SRx receiver 160b. In one configuration, the receiver chip 116 may also include a global positioning system (GPS) receiver (i.e., when the fourth antenna 112 is a global positioning system (GPS) antenna). The second PRx receiver 158b may output a tertiary receive TRx inphase/quadrature (I/Q) signal 122 to the baseband digital modem 126. The second SRx receiver 160b may output a quaternary receive QRx inphase/quadrature (I/Q) signal 124 to the baseband digital modem 126. The configuration of the third antenna 110, the fourth antenna 112 and the receiver chip 116 may be referred to as a second multiple-input and multiple-output (MIMO) carrier aggregation receiver reuse architecture 127. The second multiple-input and multiple-output (MIMO) carrier aggregation receiver reuse architecture 127 may also reuse a carrier aggregation receiver architecture on the wireless communication device 104 to support multiple-input and multiple-output (MIMO) communications.

The first multiple-input and multiple-output (MIMO) carrier aggregation receiver reuse architecture 125 and the second multiple-input and multiple-output (MIMO) carrier aggregation receiver reuse architecture 127 may have only a total of two synthesizers running (e.g., one in the first PRx receiver 158a and one in the second PRx receiver 158b). A synthesizer may refer to a frequency generator such as a local oscillator or a voltage controlled oscillator.

The baseband digital modem 126 may perform processing on the primary receiver PRx inphase/quadrature (I/Q) signal 118, the secondary receive SRx inphase/quadrature (I/Q) signal 120, the tertiary receive TRx inphase/quadrature (I/Q) signal 122 and the quaternary receive QRx inphase/quadrature (I/Q) signal 124. For example, the baseband digital modem 126 may convert the signals to the digital domain using analog-to-digital converters (ADCs) and perform digital processing on the signals using digital signal processors (DSPs). The baseband digital modem 126 may then output a receive signal 128.

Figure 2:
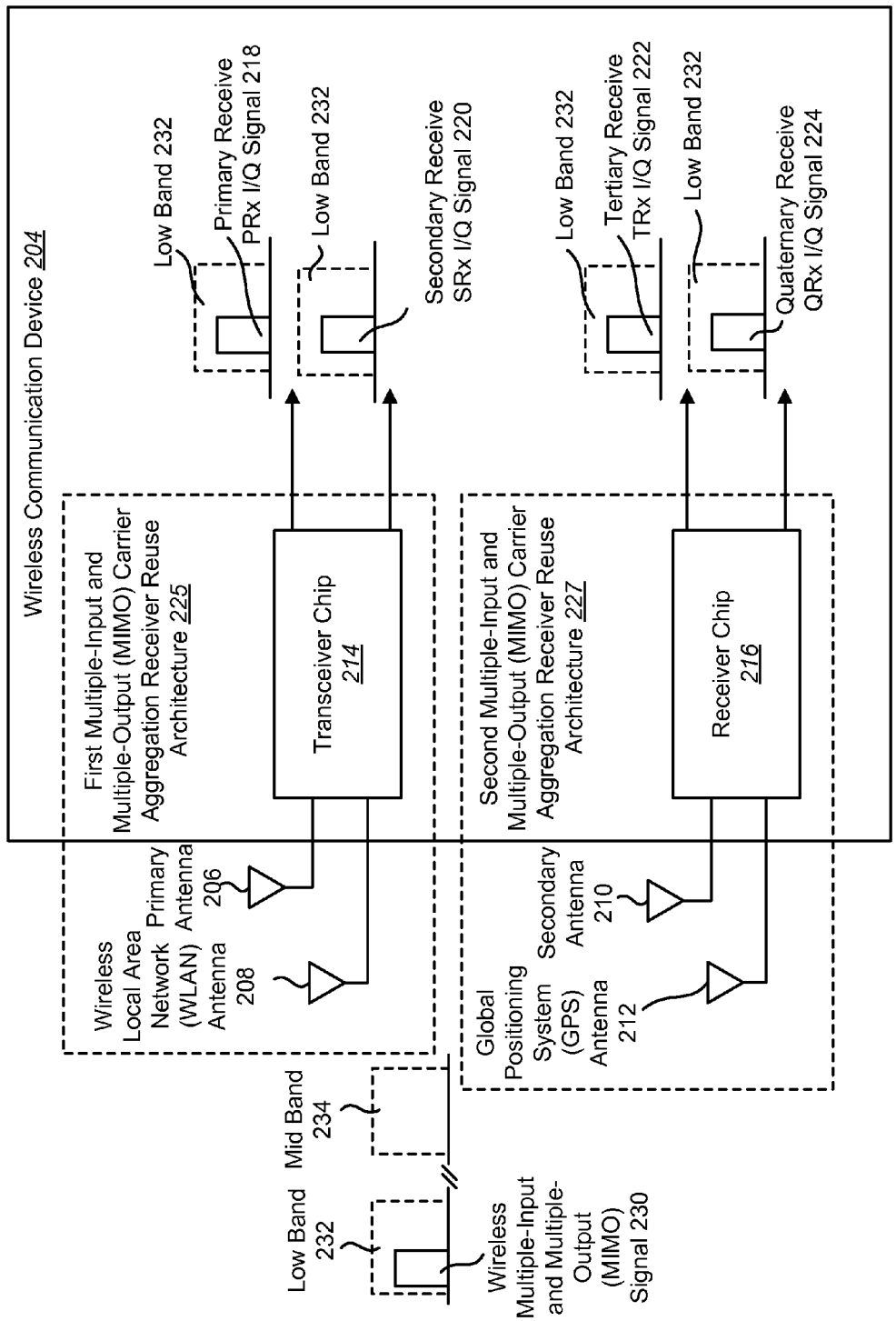
FIG. 2 is a block diagram illustrating a first multiple-input and multiple-output (MIMO) carrier aggregation receiver reuse architecture and a second multiple-input and multiple-output (MIMO) carrier aggregation receiver reuse architecture on a wireless communication device.

FIG. 2 is a block diagram illustrating a first multiple-input and multiple-output (MIMO) carrier aggregation receiver reuse architecture 225 and a second multiple-input and multiple-output (MIMO) carrier aggregation receiver reuse architecture 227 on a wireless communication device 204. The first multiple-input and multiple-output (MIMO) carrier aggregation receiver reuse architecture 225 of FIG. 2 may be one configuration of the first multiple-input and multiple-output (MIMO) carrier aggregation receiver architecture 125 of FIG. 1. The second multiple-input and multiple-output (MIMO) carrier aggregation receiver reuse architecture 227 of FIG. 2 may be one configuration of the second multiple-input and multiple-output (MIMO) carrier aggregation receiver reuse architecture 127 of FIG. 1.

The first multiple-input and multiple-output (MIMO) carrier aggregation receiver reuse architecture 225 may include a primary antenna 206, a wireless local area network (WLAN) antenna 208 and a transceiver chip 214. The first multiple-input and multiple-output (MIMO) carrier aggregation receiver reuse architecture 225 may reuse an existing carrier aggregation receiver architecture for multiple-input and multiple-output (MIMO) receiving. The second multiple-input and multiple-output (MIMO) carrier aggregation receiver reuse architecture 227 may include a secondary antenna 210, a global positioning system (GPS) antenna 212 and a receiver chip 216. The second multiple-input and multiple-output (MIMO) carrier aggregation receiver reuse architecture 227 may also reuse an existing carrier aggregation receiver architecture for multiple-input and multiple-output (MIMO) receiving.

The primary antenna 206, wireless local area network (WLAN) antenna 208, secondary antenna 210 and global positioning system (GPS) antenna 212 may each receive a wireless multiple-input and multiple-output (MIMO) signal 230 in the low band 232 as part of multiple-input and single-output (MISO) mode. No signals may be received in the mid band 234. The transceiver chip 214 may output a primary receive PRx inphase/quadrature (I/Q) signal 218 in the low band 232 and a secondary receive SRx inphase/quadrature (I/Q) signal 220 in the low band 232. The receiver chip 216 may output a tertiary receive TRx inphase/quadrature (I/Q) signal 222 in the low band 232 and a quaternary receive QRx inphase/quadrature (I/Q) signal 224 in the low band 232.

Figure 3:
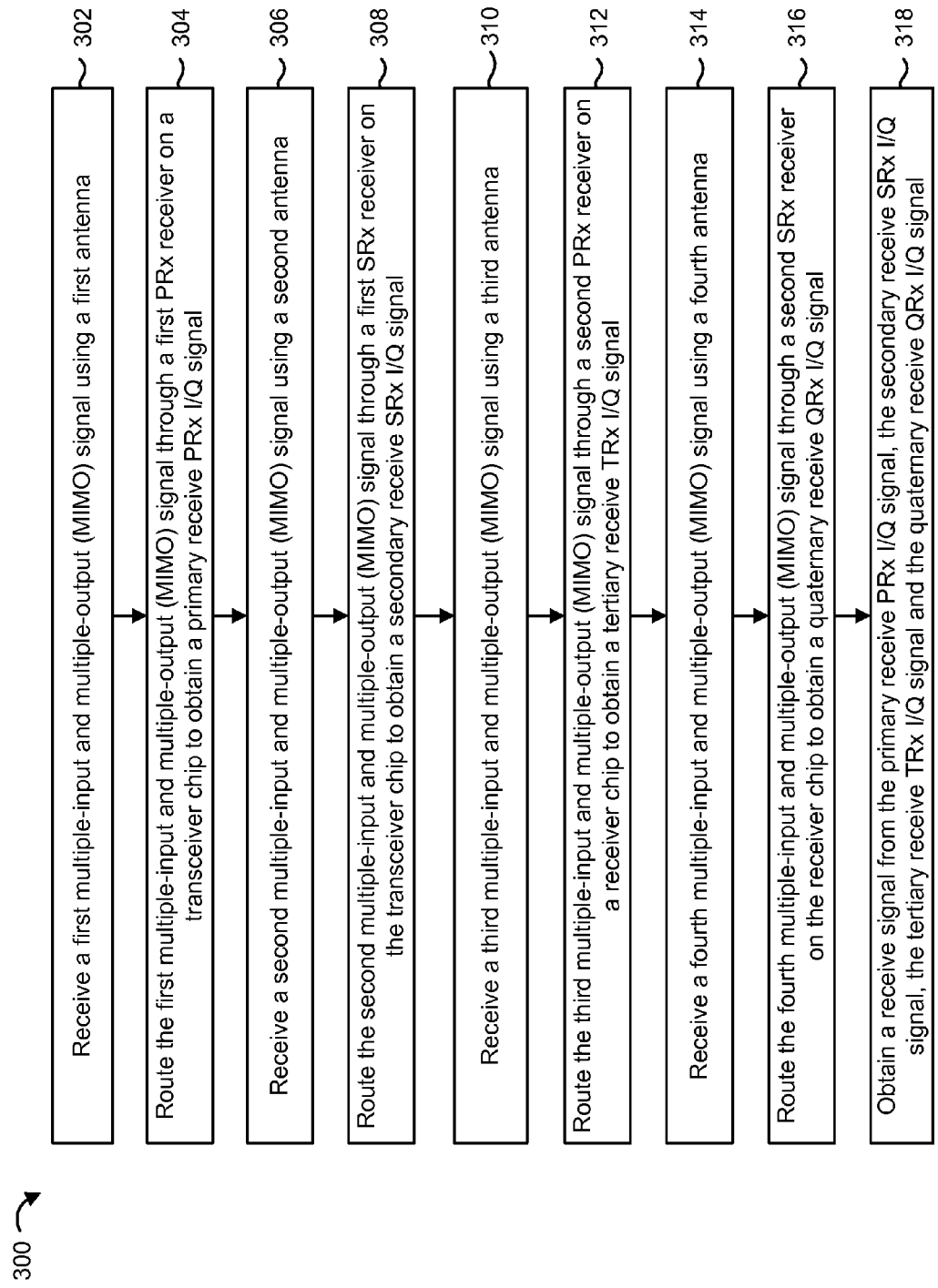
FIG. 3 is a flow diagram of a method for receiving a wireless multiple-input and multiple-output (MIMO) signal.

FIG. 3 is a flow diagram of a method 300 for receiving a wireless multiple-input and multiple-output (MIMO) signal. The method 300 may be performed by a wireless communication device 104. The wireless communication device 104 may be operating in multiple-input and single-output (MISO) mode. In multiple-input and single-output (MISO) mode, the wireless communication device 104 may receive a wireless multiple-input and multiple-output (MIMO) signal 230 using four discrete antennas. The wireless communication device 104 may then use digital processing to obtain a receive signal 128. Because each of the antennas are physically separated from the other antennas (i.e., located on different places on the wireless communication device 104), each antenna may receive a different version of the wireless multiple-input and multiple-output (MIMO) signal 230.

The wireless communication device 104 may receive 302 a first multiple-input and multiple-output (MIMO) signal using a first antenna. The first multiple-input and multiple-output (MIMO) signal refers to the version of the wireless multiple-input and multiple-output (MIMO) signal 230 received by the first antenna 106. The wireless communication device 104 may route 304 the first multiple-input and multiple-output (MIMO) signal through a first PRx receiver 158a on a transceiver chip 114 to obtain a primary receive PRx inphase/quadrature (I/Q) signal 118. The wireless communication device 104 may also receive 306 a second multiple-input and multiple-output (MIMO) signal using a second antenna 108. The second multiple-input and multiple-output (MIMO) signal refers to the version of the wireless multiple-input and multiple-output (MIMO) signal 230 received by the second antenna 108. The wireless communication device 104 may route 308 the second multiple-input and multiple-output (MIMO) signal through a first SRx receiver 160a on the transceiver chip 114 to obtain a secondary receive SRx inphase/quadrature (I/Q) signal 120.

The wireless communication device 104 may receive 310 a third multiple-input and multiple-output (MIMO) signal using a third antenna 110. The third multiple-input and multiple-output (MIMO) signal refers to the version of the wireless multiple-input and multiple-output (MIMO) signal 230 received by the third antenna 110. The wireless communication device 104 may route 312 the third multiple-input and multiple-output (MIMO) signal through a second PRx receiver 158b on a receiver chip 116 to obtain a tertiary receive TRx inphase/quadrature (I/Q) signal 122. The wireless communication device 104 may also receive 314 a fourth multiple-input and multiple-output (MIMO) signal using a fourth antenna 112. The fourth multiple-input and multiple-output (MIMO) signal refers to the version of the wireless multiple-input and multiple-output (MIMO) signal 230 received by the fourth antenna 112. The wireless communication device 104 may route 316 the fourth multiple-input and multiple-output (MIMO) signal through a second SRx receiver 160b on the receiver chip 116 to obtain a quaternary receive QRx inphase/quadrature (I/Q) signal 124. The wireless communication device 104 may obtain 318 a receive signal 128 from the primary receive PRx inphase/quadrature (I/Q) signal 118, the secondary receive SRx inphase/quadrature (I/Q) signal 120, the tertiary receive TRx inphase/quadrature (I/Q) signal 122 and the quaternary receive QRx inphase/quadrature (I/Q) signal 124.

Figure 4:
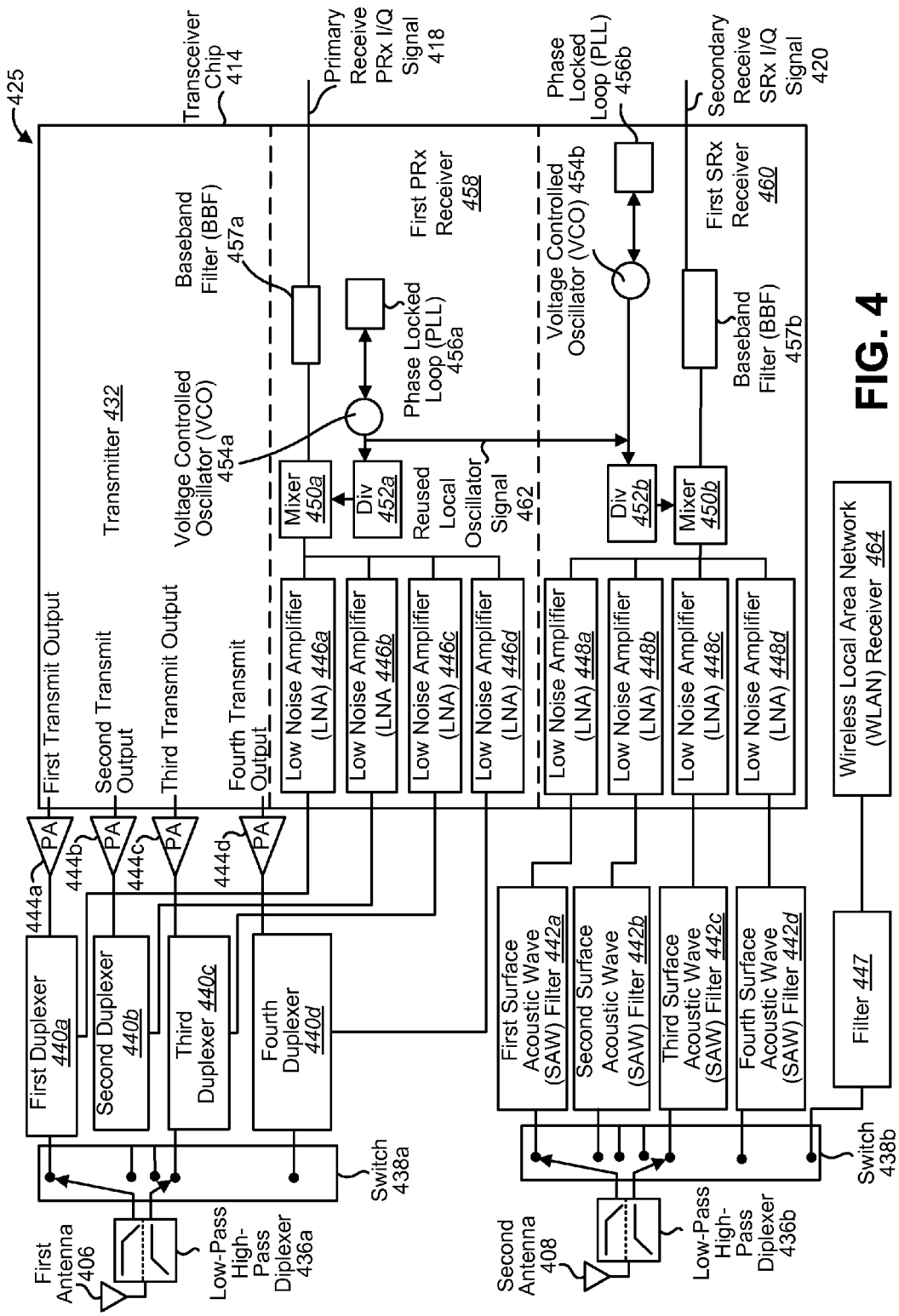
FIG. 4 is a block diagram illustrating a first multiple-input and multiple-output (MIMO) carrier aggregation receiver reuse architecture.

FIG. 4 is a block diagram illustrating a first multiple-input and multiple-output (MIMO) carrier aggregation receiver reuse architecture 425. The first multiple-input and multiple-output (MIMO) carrier aggregation receiver reuse architecture 425 of FIG. 4 may be one configuration of the first multiple-input and multiple-output (MIMO) carrier aggregation receiver reuse architecture 125 of FIG. 1. The first multiple-input and multiple-output (MIMO) carrier aggregation receiver reuse architecture 425 may include a first antenna 406, a first low-pass high-pass diplexer 436a, a first switch 438a, four duplexers 440a-d, a second antenna 408, a second low-pass high-pass diplexer 436b, a second switch 438b, four surface acoustic wave (SAW) filters 442a-d and a transceiver chip 414. As discussed above, in one configuration, the second antenna 408 may be a wireless local area network (WLAN) antenna 208.

The first antenna 406 may be coupled to the first low-pass high-pass diplexer 436a. A low-pass high-pass diplexer 436 may bundle low band frequencies into one signal and high band (or midband) frequencies into another signal, thus allowing the first antenna 406 to pass both low band and midband signals to the transceiver chip 414. The first low-pass high-pass diplexer 436a may be coupled to the first switch 438a. The first switch 438a may have two inputs (the signal that includes the bundled low band frequencies and the signal that includes the bundled high band frequencies) and multiple outputs. In one configuration, the first switch 438a may have six possible outputs to the four duplexers 440 (representing the six possible configurations of duplexer 440 pairs). The four duplexers 440 may include a first duplexer 440a, a second duplexer 440b, a third duplexer 440c and a fourth duplexer 440d. In one configuration, the first duplexer 440a and the second duplexer 440b may be used for a low band while the third duplexer 440c and the fourth duplexer 440d are used for a midband.

The transceiver chip 414 may include a transmitter 432, a first PRx receiver 458 and a first SRx receiver 460. The transmitter 432 may include four transmit outputs: a first transmit output, a second transmit output, a third transmit output and a fourth transmit output. In one configuration, the first transmit output and the second transmit output may be low band outputs while the third transmit output and the fourth transmit output are midband outputs.

The first transmit output may be coupled to the first duplexer 440a via a power amplifier (PA) 444a. The second transmit output may be coupled to the second duplexer 440b via a power amplifier (PA) 444b. The third transmit output may be coupled to the third duplexer 440c via a power amplifier (PA) 444c. The fourth transmit output may be coupled to the fourth duplexer 440d via a power amplifier (PA) 444d.

The first PRx receiver 458 may include four low noise amplifiers (LNAs) 446a-d. The first low noise amplifier (LNA) 446a may be coupled to the first duplexer 440a, the second low noise amplifier (LNA) 446b may be coupled to the second duplexer 440b, the third low noise amplifier (LNA) 446c may be coupled to the third duplexer 440c and the fourth low noise amplifier (LNA) 446d may be coupled to the fourth duplexer 440d. In one configuration, the first low noise amplifier (LNA) 446a and the second low noise amplifier (LNA) 446b may be low band low noise amplifiers (LNAs) while the third low noise amplifier (LNA) 446c and the fourth low noise amplifier (LNA) 446d are midband low noise amplifiers (LNAs).

The first PRx receiver 458 may also include a mixer 450a (e.g., a downconverter). The mixer 450a may be coupled to the output of the first low noise amplifier (LNA) 446a, the output of the second low noise amplifier (LNA) 446b, the output of the third low noise amplifier (LNA) 446c and the output of the fourth low noise amplifier (LNA) 446d.

The first PRx receiver 458 may include a phase locked loop (PLL) 456a, a voltage controlled oscillator (VCO) 454a and a Div stage 452a that are used to generate the downconverting frequency for the mixer 450a. The output of the mixer 450a may be coupled to a baseband filter (BBF) 457a. The baseband filter (BBF) 457a may then output the primary receive PRx inphase/quadrature (I/Q) signal 418.

The second antenna 408 may be coupled to the second low-pass high-pass diplexer 436b. The second low-pass high-pass diplexer 436b may be coupled to the second switch 438b. The second switch 438b may have two inputs (the signal that includes the bundled low band frequencies and the signal that includes the bundled high band frequencies) and multiple outputs. In one configuration, the second switch 438b may have seven possible outputs to the four surface acoustic wave (SAW) filters 442a-d and a filter 447 (representing the seven possible configurations of filter pairs). The filter 447 may be coupled to a wireless local area network (WLAN) receiver 464. If the second antenna 408 is a wireless local area network (WLAN) antenna 208, the filter 447 may filter wireless local area network (WLAN) received signals before passing the signals to the wireless local area network (WLAN) receiver 464. In the first multiple-input and multiple-output (MIMO) carrier aggregation receiver reuse architecture 425, the input to the filter 447 is disabled.

The four surface acoustic wave (SAW) filters 442 may include a first surface acoustic wave (SAW) filter 442a, a second surface acoustic wave (SAW) filter 442b, a third surface acoustic wave (SAW) filter 442c and a fourth surface acoustic wave (SAW) filter 442d. In one configuration, the first surface acoustic wave (SAW) filter 442a and the second surface acoustic wave (SAW) filter 442b may be used for the low band while the third surface acoustic wave (SAW) filter 442c and the fourth surface acoustic wave (SAW) filter 442d are used for the midband.

The first SRx receiver 460 may include a first low noise amplifier (LNA) 448a coupled to the first surface acoustic wave (SAW) filter 442a, a second low noise amplifier (LNA) 448b coupled to the second surface acoustic wave (SAW) filter 442b, a third low noise amplifier (LNA) 448c coupled to the third surface acoustic wave (SAW) filter 442c and a fourth low noise amplifier (LNA) 448d coupled to the fourth surface acoustic wave (SAW) filter 442d. In one configuration, the first low noise amplifier (LNA) 448a and the second low noise amplifier (LNA) 448b may be low band low noise amplifiers (LNAs) while the third low noise amplifier (LNA) 448c and the fourth low noise amplifier (LNA) 448d are midband low noise amplifiers (LNAs).

The first SRx receiver 460 may include a mixer 450b coupled to the output of the first low noise amplifier (LNA) 448a, the output of the second low noise amplifier (LNA) 448b, the output of the third low noise amplifier (LNA) 448c and the output of the fourth low noise amplifier (LNA) 448d. The first SRx receiver 460 may also include a phase locked loop (PLL) 456b, a voltage controlled oscillator (VCO) 454b and a Div stage 452b that are used to generate a downconverting frequency for the mixer 450b. When the wireless communication device 104 is operating in multiple-input and multiple-output (MIMO) mode, the voltage controlled oscillator (VCO) 454b and the phase locked loop (PLL) 456b may be deactivated. The Div stage 452b may instead receive a reused local oscillator signal 462 generated by the voltage controlled oscillator (VCO) 454a of the first PRx receiver 458. The output of the mixer 450b may be coupled to a baseband filter (BBF) 457b. The baseband filter (BBF) 457b may then output the secondary receive SRx inphase/quadrature (I/Q) signal 420.

Figure 5:
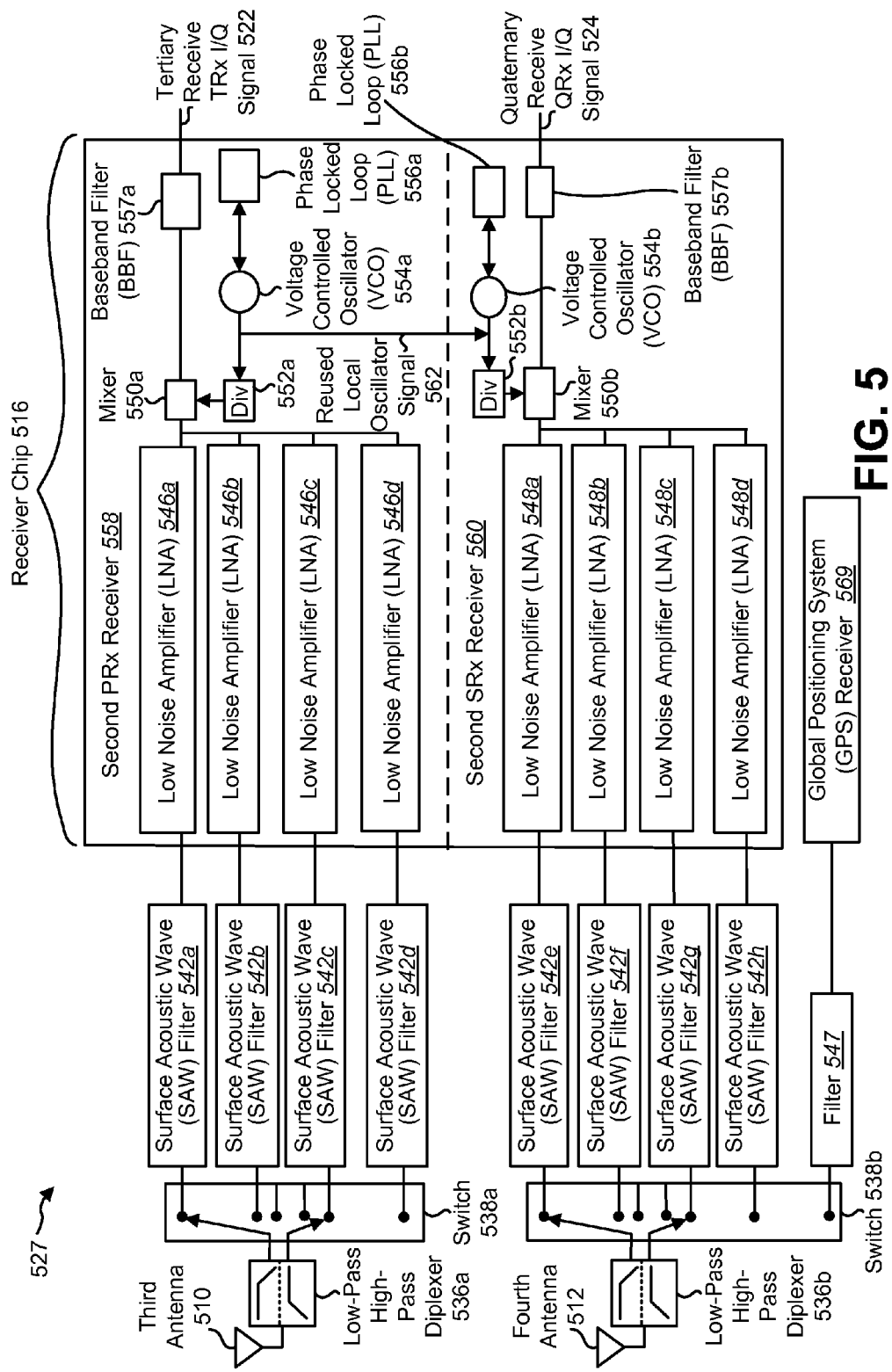
FIG. 5 is a block diagram illustrating a second multiple-input and multiple-output (MIMO) carrier aggregation receiver reuse architecture.

FIG. 5 is a block diagram illustrating a second multiple-input and multiple-output (MIMO) carrier aggregation receiver reuse architecture 527. The second multiple-input and multiple-output (MIMO) carrier aggregation receiver reuse architecture 527 of FIG. 5 may be one configuration of the second multiple-input and multiple-output (MIMO) carrier aggregation receiver reuse architecture 127 of FIG. 1. The second multiple-input and multiple-output (MIMO) carrier aggregation receiver reuse architecture 527 may include a third antenna 510, a third low-pass high-pass diplexer 536a, a third switch 538a, four surface acoustic wave (SAW) filters 542a-d for the third antenna 510, a fourth antenna 512, a fourth low-pass high-pass diplexer 536b, a fourth switch 538b, four surface acoustic wave (SAW) filters 542e-h for the fourth antenna 512 and a receiver chip 516. As discussed above, in one configuration, the fourth antenna 512 may be a global positioning system (GPS) antenna 212.

The third antenna 510 may be coupled to the third low-pass high-pass diplexer 536a. The third low-pass high-pass diplexer 536a may be coupled to the third switch 538a. The third switch 538a may have two inputs (the signal that includes the bundled low band frequencies and the signal that includes the bundled high band frequencies) and multiple outputs. In one configuration, the third switch 538a may have six possible outputs to the four surface acoustic wave (SAW) filters 542a-d for the third antenna 510 (representing the six possible configurations of surface acoustic wave (SAW) filter 542a-d pairs). The four surface acoustic wave (SAW) filters 542 for the third antenna 510 may include a first surface acoustic wave (SAW) filter 542a, a second surface acoustic wave (SAW) filter 542b, a third surface acoustic wave (SAW) filter 542c and a fourth surface acoustic wave (SAW) filter 542d. In one configuration, the first surface acoustic wave (SAW) filter 542a and the second surface acoustic wave (SAW) filter 542b may be used for a low band while the third surface acoustic wave (SAW) filter 542c and the fourth surface acoustic wave (SAW) filter 542d are used for a midband.

The receiver chip 516 may include a second PRx receiver 558 and a second SRx receiver 560. The second PRx receiver 558 may include four low noise amplifiers (LNAs) 546a-d. The first low noise amplifier (LNA) 546aa may be coupled to the first surface acoustic wave (SAW) filter 542a, the second low noise amplifier (LNA) 546b may be coupled to the second surface acoustic wave (SAW) filter 542b, the third low noise amplifier (LNA) 546c may be coupled to the third surface acoustic wave (SAW) filter 542c and the fourth low noise amplifier (LNA) 546d may be coupled to the fourth surface acoustic wave (SAW) filter 542d. In one configuration, the first low noise amplifier (LNA) 546a and the second low noise amplifier (LNA) 546b may be low band low noise amplifiers (LNAs) while the third low noise amplifier (LNA) 546c and the fourth low noise amplifier (LNA) 546d are midband low noise amplifiers (LNAs).

The second PRx receiver 558 may include a mixer 550a. The mixer 550a may be coupled to the output of the first low noise amplifier (LNA) 546a, the output of the second low noise amplifier (LNA) 546b, the output of the third low noise amplifier (LNA) 546c and the output of the fourth low noise amplifier (LNA) 546d.

The second PRx receiver 558 may include a phase locked loop (PLL) 556a, a voltage controlled oscillator (VCO) 554a and a Div stage 552a that are used to generate the downconverting frequency for the mixer 550a. The output of the mixer 550a may be coupled to a baseband filter (BBF) 557a. The baseband filter (BBF) 557a may then output the tertiary receive TRx inphase/quadrature (I/Q) signal 522.

The fourth antenna 512 may be coupled to the fourth lowpass high-pass diplexer 536b. The fourth low-pass high-pass diplexer 536b may be coupled to the fourth switch 538b. The fourth switch 538b may have two inputs (the signal that includes the bundled low band frequencies and the signal that includes the bundled high band frequencies) and multiple outputs. In one configuration, the fourth switch 538b may have seven possible outputs to the four surface acoustic wave (SAW) filters 542e-h and a filter 547 (representing the seven possible configurations of filter pairs). The filter 547 may be coupled to a global positioning system (GPS) receiver 569. If the fourth antenna 512 is a global positioning system (GPS) antenna 212, the filter 547 may filter global positioning system (GPS) received signals before passing the signals to the global positioning system (GPS) receiver 569. In the second multiple-input and multiple-output (MIMO) carrier aggregation receiver reuse architecture 527, the input to the filter 547 is disabled.

In one configuration, the fifth surface acoustic wave (SAW) filter 542e and the sixth surface acoustic wave (SAW) filter 542f may be used for the low band while the seventh surface acoustic wave (SAW) filter 542g and the eighth surface acoustic wave (SAW) filter 542h are used for the midband.

The second SRx receiver 560 may include a first low noise amplifier (LNA) 548a coupled to the fifth surface acoustic wave (SAW) filter 542e, a second low noise amplifier (LNA) 548b coupled to the sixth surface acoustic wave (SAW) filter 542f, a third low noise amplifier (LNA) 548c coupled to the seventh surface acoustic wave (SAW) filter 542g and a fourth low noise amplifier (LNA) 548d coupled to the eighth surface acoustic wave (SAW) filter 542h. In one configuration, the first low noise amplifier (LNA) 548a and the second low noise amplifier (LNA) 548b may be low band low noise amplifiers (LNAs) while the third low noise amplifier (LNA) 548c and the fourth low noise amplifier (LNA) 548d are midband low noise amplifiers (LNAs).

The second SRx receiver 560 may include a mixer 550b coupled to the output of the first low noise amplifier (LNA) 548a, the output of the second low noise amplifier (LNA) 548b, the output of the third low noise amplifier (LNA) 548c and the output of the fourth low noise amplifier (LNA) 548d. The second SRx receiver 560 may also include a phase locked loop (PLL) 556b, a voltage controlled oscillator (VCO) 554b and a Div stage 552b that are used to generate a downconverting frequency for the mixer 550b. When the wireless communication device 104 is operating in multiple-input and multiple-output (MIMO) mode, the voltage controlled oscillator (VCO) 554b and the phase locked loop (PLL) 556b may be deactivated (so that a total of only two synthesizers are running on the wireless communication device 104). The Div stage 552b may instead receive a reused local oscillator signal 562 from the voltage controlled oscillator (VCO) 554a of the second PRx receiver 558. The output of the mixer 550b may be coupled to a baseband filter (BBF) 557b. The baseband filter (BBF) 557b may then output the quaternary receive QRx inphase/quadrature (I/Q) signal 524.

Figure 6:
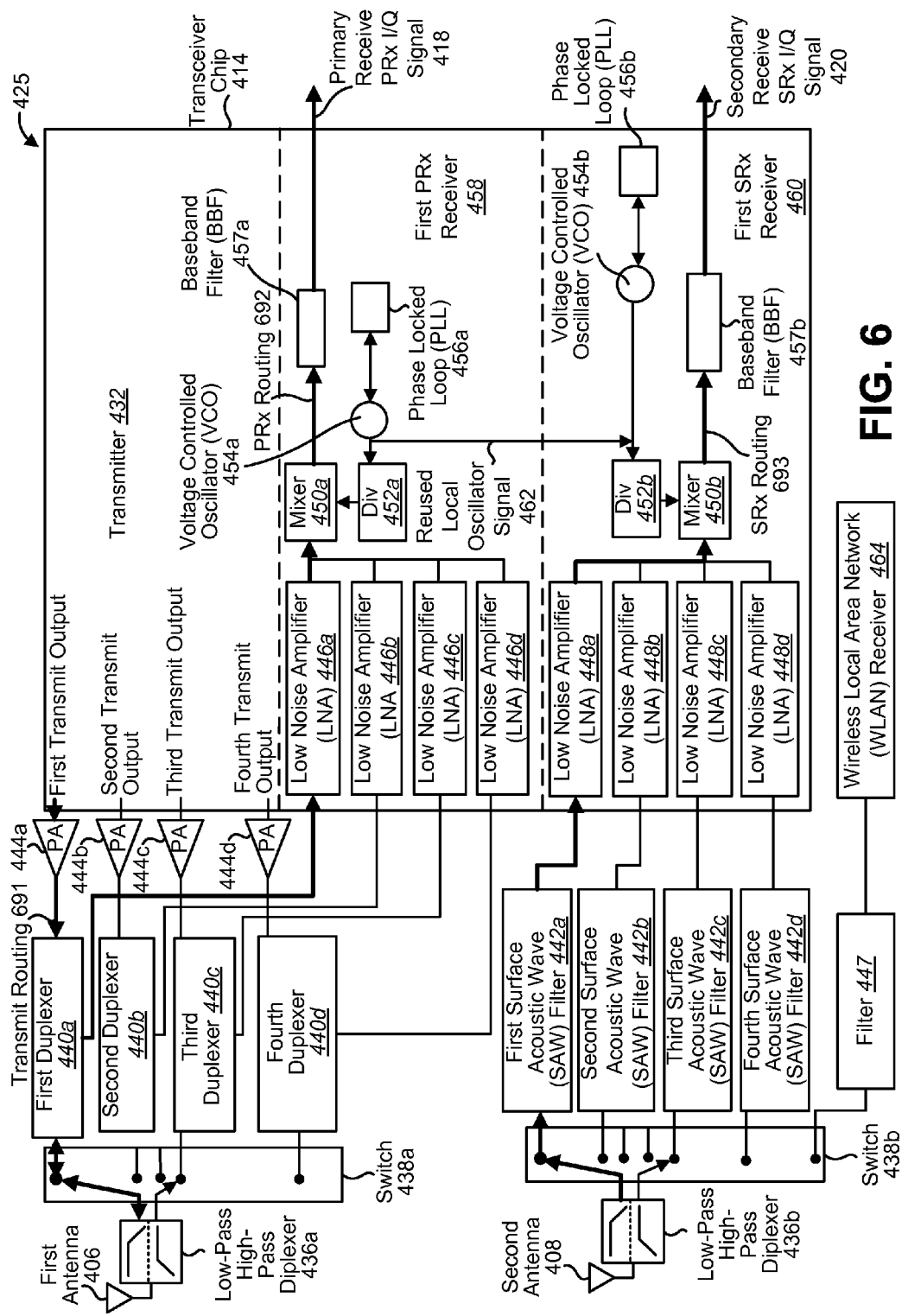
FIG. 6 is another block diagram illustrating a first multiple-input and multiple-output (MIMO) carrier aggregation reuse architecture.

FIG. 6 is another block diagram illustrating a first multiple-input and multiple-output (MIMO) carrier aggregation reuse architecture 425. The first multiple-input and multiple-output (MIMO) carrier aggregation reuse architecture 425 of FIG. 6 may be the first multiple-input and multiple-output (MIMO) carrier aggregation reuse architecture 425 of FIG. 4. The first antenna 406 and the second antenna 408 may each receive a wireless multiple-input and multiple-output (MIMO) signal 230. Due to a physical separation between the first antenna 406 and the second antenna 408, the first antenna 406 may receive a different version of the wireless multiple-input and multiple-output (MIMO) signal 230 than the second antenna 408.

A transmit routing 691 is shown from the transmitter 432 to the first antenna 406. The transmit routing 691 may be used for transmitting signals. The transmit routing 691 may pass through the first power amplifier (PA) 444a, the first duplexer 440a and the low-pass high-pass diplexer 436a. A PRx routing 692 from the first antenna 406 through the first PRx receiver 458 to obtain the primary receive PRx inphase/quadrature (I/Q) signal 418 is also shown. The PRx routing 692 may pass through the first duplexer 440a, the first low noise amplifier (LNA) 446a of the first PRx receiver 458, the mixer 450a and the baseband filter (BBF) 457a. An SRx routing 693 from the second antenna 408 through the first SRx receiver 460 to obtain the secondary receive SRx inphase/quadrature (I/Q) signal 420 is shown. The SRx routing 693 may pass through the first surface acoustic wave (SAW) filter 442a, the first low noise amplifier (LNA) 448a of the first SRx receiver 460, the mixer 450b and the baseband filter (BBF) 457b. The PRx routing 692 and the SRx routing 693 may reuse a carrier aggregation receiver architecture.

Figure 7:
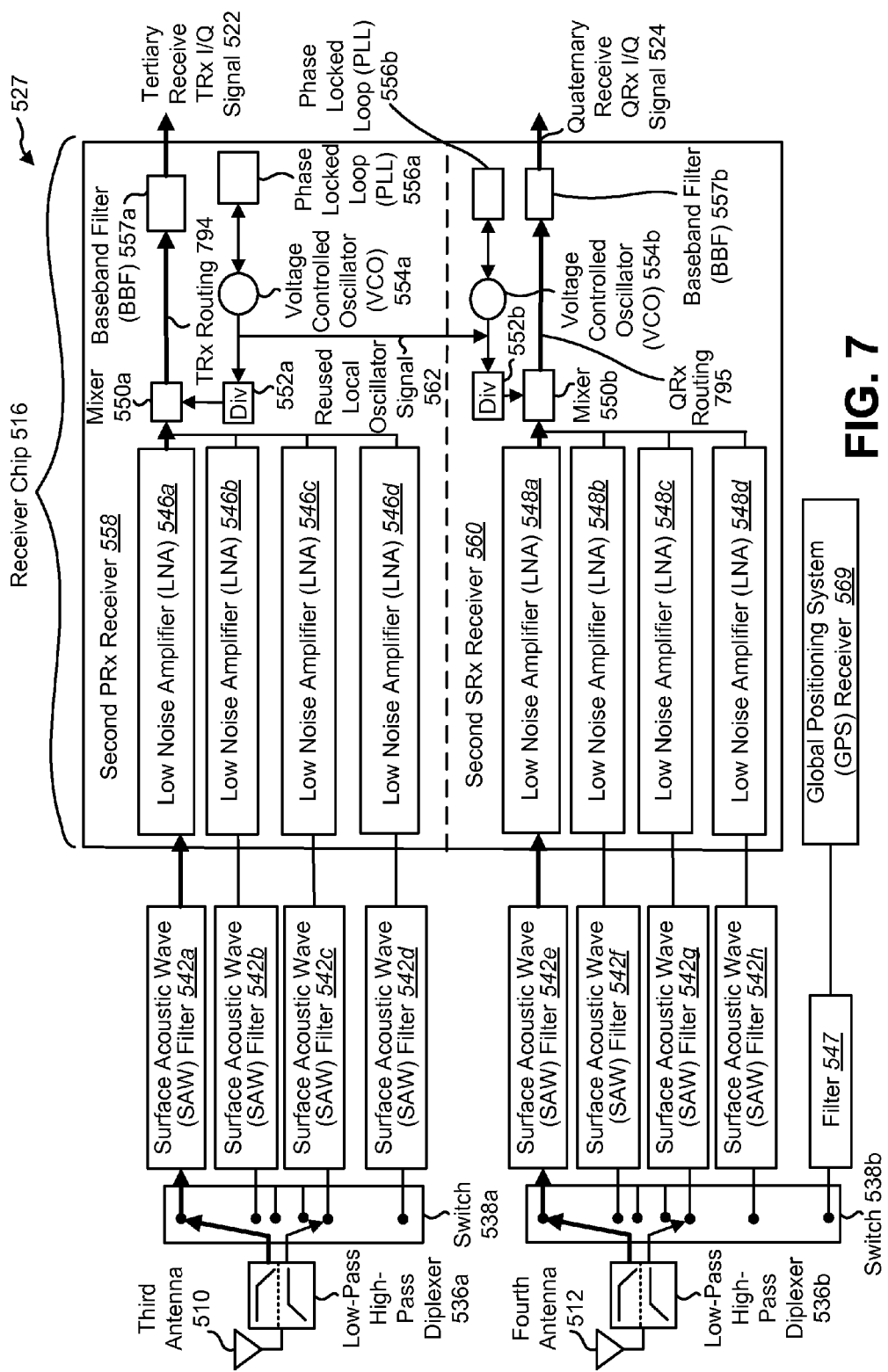
FIG. 7 is another block diagram illustrating a second multiple-input and multiple-output (MIMO) carrier aggregation reuse architecture.

FIG. 7 is another block diagram illustrating a second multiple-input and multiple-output (MIMO) carrier aggregation reuse architecture 527. The second multiple-input and multiple-output (MIMO) carrier aggregation reuse architecture 527 of FIG. 7 may be the second multiple-input and multiple-output (MIMO) carrier aggregation reuse architecture 527 of FIG. 5. The third antenna 510 and the fourth antenna 512 may each receive a wireless multiple-input and multiple-output (MIMO) signal 230. Due to a physical separation between the third antenna 510 and the fourth antenna 512, the third antenna 510 may receive a different version of the wireless multiple-input and multiple-output (MIMO) signal 230 than the fourth antenna 512.

A TRx routing 794 from the third antenna 510 through the second PRx receiver 558 to obtain the tertiary receive TRx inphase/quadrature (I/Q) signal 522 is shown. The TRx routing 794 may pass through the first surface acoustic wave (SAW) filter 542a, the first low noise amplifier (LNA) 546a of the second PRx receiver 558, the mixer 550a and the baseband filter (BBF) 557a. A QRx routing 795 from the fourth antenna 512 through the second SRx receiver 560 to obtain the quaternary receive QRx inphase/quadrature (I/Q) signal 524 is also shown. The QRx routing 795 may pass through the fifth surface acoustic wave (SAW) filter 542e, the first low noise amplifier (LNA) 548a of the second SRx receiver 560, the mixer 550b and the baseband filter (BBF) 557b. The TRx routing 794 and the QRx routing 795 may reuse a carrier aggregation receiver architecture.

Figure 8:
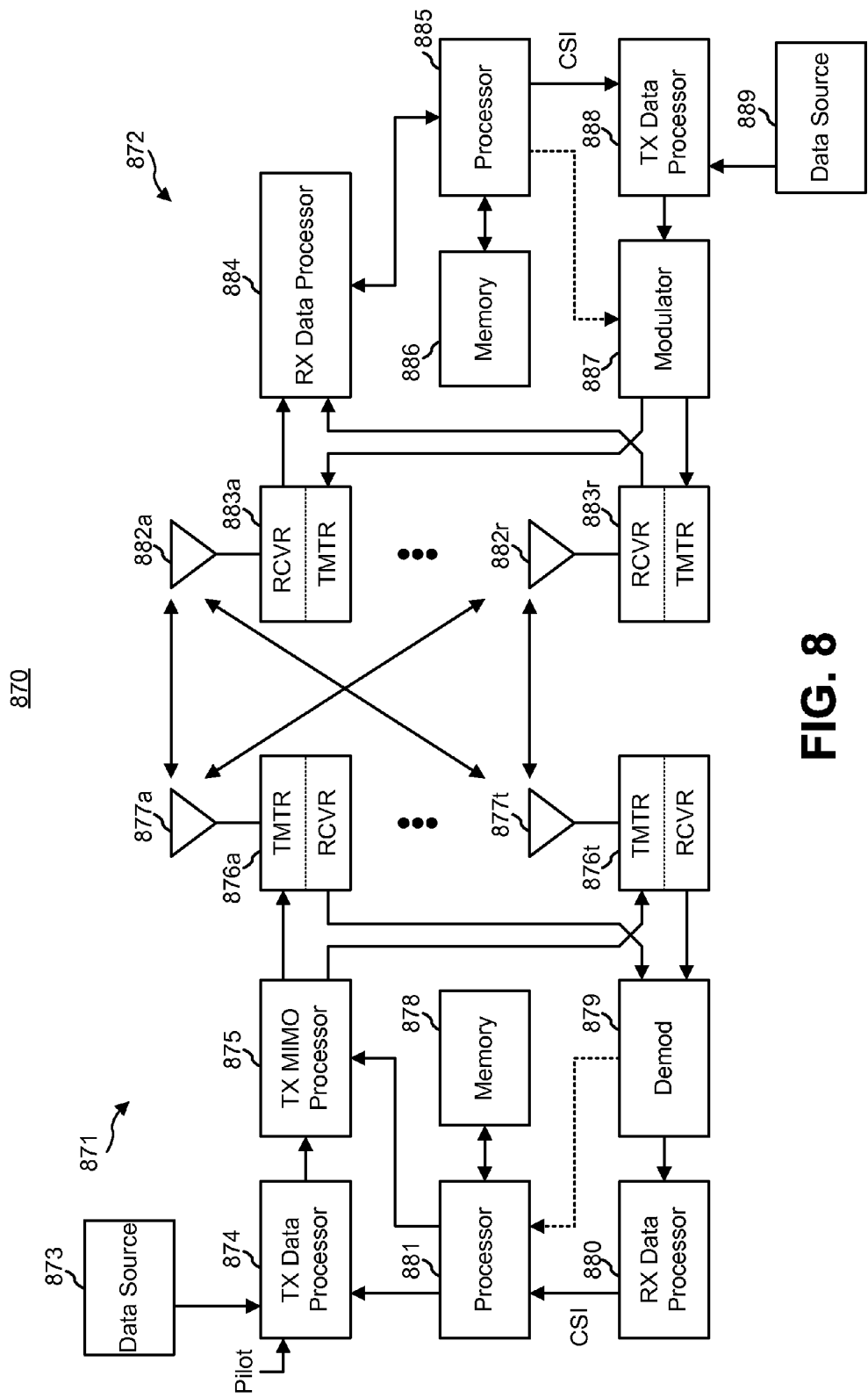
FIG. 8 is a block diagram of a transmitter and receiver in a multiple-input and multiple-output (MIMO) system.

FIG. 8 is a block diagram of a transmitter 871 and receiver 872 in a multiple-input and multiple-output (MIMO) system

870. In the transmitter 871, traffic data for a number of data streams is provided from a data source 873 to a transmit (TX) data processor 874. Each data stream may then be transmitted over a respective transmit antenna 877a through 877t. The transmit (TX) data processor 874 may format, code, and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 872 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 875, which may further process the modulation symbols (e.g., for OFDM). The transmit (TX) multiple-input multiple-output (MIMO) processor 875 then provides NT modulation symbol streams to NT transmitters (TMTR) 876a through 876t. The TX transmit (TX) multiple-input multiple-output (MIMO) processor 875 may apply beamforming weights to the symbols of the data streams and to the antenna 877 from which the symbol is being transmitted.

Each transmitter 876 may receive and process a respective symbol stream to provide one or more analog signals, and further condition (e.g., amplify, filter and upconvert) the analog signals to provide a modulated signal suitable for transmission over the multiple-input and multiple-output (MIMO) channel. NT modulated signals from transmitters 876a through 876t are then transmitted from NT antennas 877a through 877t, respectively.

At the receiver 872, the transmitted modulated signals are received by NR antennas 882a through 882r and the received signal from each antenna 882 is provided to a respective receiver (RCVR) 883a through 883r. Each receiver 883 may condition (e.g., filter, amplify and downconvert) a respective received signal, digitize the conditioned signal to provide samples, and further process the samples to provide a corresponding "received" symbol stream.

An RX data processor 884 then receives and processes the NR received symbol streams from NR receivers 883 based on a particular receiver processing technique to provide NT "detected" symbol streams. The RX data processor 884 then demodulates, deinterleaves and decodes each detected symbol stream to recover the traffic data for the data stream. The processing by RX data processor 884 is complementary to that performed by TX multiple-input and multiple-output (MIMO) processor 875 and TX data processor 874 at transmitter system 871.

A processor 885 may periodically determine which pre-coding matrix to use. The processor 885 may store information on and retrieve information from memory 886. The processor 885 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 888, which also receives traffic data for a number of data streams from a data source 889, modulated by a modulator 887, conditioned by transmitters 883a through 883r, and transmitted back to the transmitter 871.

At the transmitter 871, the modulated signals from the receiver 872 are received by antennas 877, conditioned by receivers 876, demodulated by a demodulator 879, and processed by an RX data processor 880 to extract the reverse link message transmitted by the receiver system 872. A processor 881 may receive channel state information (CSI) from the RX data processor 880. The processor 881 may store information on and retrieve information from memory 878. The processor 881 then determines which pre-coding matrix to use for determining the beamforming weights and then processes the extracted message.

Figure 9:
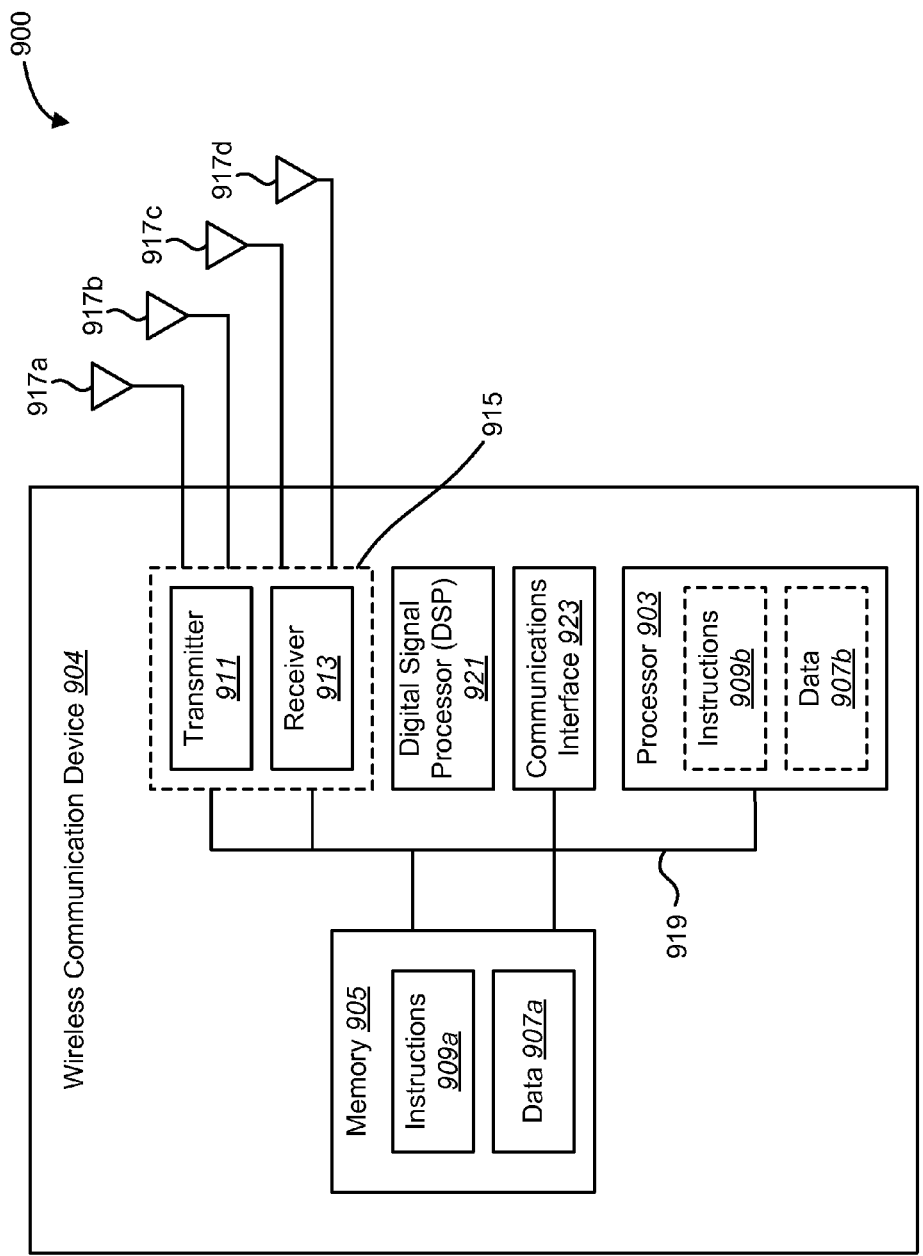
FIG. 9 illustrates certain components that may be included within a wireless communication device.

FIG. 9 illustrates certain components that may be included within a wireless communication device 904. The wireless communication device 904 may be an access terminal, a mobile station, a user equipment (UE), etc. The wireless communication device 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 904 of FIG. 9, in an alternative configuration, a combination of processors (e.g., an ARM and DSP) could be used.

The wireless communication device 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 904 may also include a transmitter 911 and a receiver 913 to allow transmission and reception of signals to and from the wireless communication device 904 via a first antenna 917a, a second antenna 917b, a third antenna 917c and a fourth antenna 917d. The transmitter 911 and receiver 913 may be collectively referred to as a transceiver 915. The wireless communication device 904 may also include (not shown) multiple transmitters, additional antennas, multiple receivers and/or multiple transceivers.

The wireless communication device 904 may include a digital signal processor (DSP) 921. The wireless communication device 904 may also include a communications interface 923. The communications interface 923 may allow a user to interact with the wireless communication device 904.

The various components of the wireless communication device 904 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless communication device configured for receiving a wireless multiple-input and multiple-output signal, comprising:
    a first multiple-input and multiple-output carrier aggregation receiver reuse architecture that comprises:
        a first antenna coupled to a transceiver chip;
        a second antenna coupled to the transceiver chip, wherein the second antenna is a wireless local area network antenna; and
        the transceiver chip, wherein the transceiver chip comprises a first primary receiver and a first secondary receiver that are configured for both carrier aggregation operation and multiple-input and multiple-output operation; and
    a second multiple-input and multiple-output carrier aggregation receiver reuse architecture that comprises:
        a third antenna coupled to a receiver chip;
        a fourth antenna coupled to the receiver chip, wherein the fourth antenna is a global positioning system antenna; and
        the receiver chip, wherein the receiver chip comprises a second primary receiver and a second secondary receiver that are configured for both carrier aggregation operation and multiple-input and multiple-output operation.

2. The wireless communication device of claim 1, wherein the wireless communication device does not require a power splitter, an external low noise amplifier or die-to-die signal routing.

3. The wireless communication device of claim 1, wherein the transceiver chip comprises:
    a transmitter,
        wherein each receiver comprises multiple low noise amplifiers.

4. The wireless communication device of claim 3, wherein a first routing is used from the first antenna through the first primary receiver to obtain a primary receive inphase/quadrature signal, wherein a second routing is used from the second antenna through the first secondary receiver to obtain a secondary receive inphase/quadrature signal, wherein a third routing is used from the third antenna through the second primary receiver to obtain a tertiary receive inphase/quadrature signal, and wherein a fourth routing is used from the fourth antenna through the second secondary receiver to obtain a quaternary receive inphase/quadrature signal.

5. The wireless communication device of claim 4, wherein the first routing passes through a duplexer and through a low noise amplifier on the first primary receiver.

6. The wireless communication device of claim 4, wherein the second routing passes through a surface acoustic wave filter and through a low noise amplifier on the first secondary receiver.

7. The wireless communication device of claim 4, wherein the third routing passes through a surface acoustic wave filter and through a low noise amplifier on the second primary receiver.

8. The wireless communication device of claim 4, wherein the fourth routing passes through a surface acoustic wave filter and through a low noise amplifier on the second secondary receiver.

9. The wireless communication device of claim 3, wherein only two synthesizers are running on the wireless communication device when the wireless communication device is receiving multiple-input and multiple-output communications.

10. The wireless communication device of claim 9, wherein the first primary receiver comprises a first synthesizer, wherein the second primary receiver comprises a second synthesizer, wherein the first synthesizer is shared with the first secondary receiver, and wherein the second synthesizer is shared with the second secondary receiver.

11. The wireless communication device of claim 1, wherein the wireless communication device is configured to receive 4Rx multiple-input and multiple-output communications using the first antenna, the second antenna, the third antenna and the fourth antenna.

12. A method for receiving a multiple-input and multiple-output wireless signal, comprising:
receiving a first multiple-input and multiple-output wireless signal using a first antenna, wherein the first antenna is coupled to a transceiver chip;
routing the first multiple-input and multiple-output wireless signal through a first primary receiver on the transceiver chip to obtain a primary receive inphase/quadrature signal;
receiving a second multiple-input and multiple-output wireless signal using a second antenna, wherein the second antenna is coupled to the transceiver chip, and wherein the second antenna is a wireless local area network antenna;
routing the second multiple-input and multiple-output wireless signal through a first secondary receiver on the transceiver chip to obtain a secondary receive inphase/quadrature signal;
receiving a third multiple-input and multiple-output wireless signal using a third antenna, wherein the third antenna is coupled to a receiver chip;
routing the third multiple-input and multiple-output wireless signal through a second primary receiver on the receiver chip to obtain a tertiary receive inphase/quadrature signal;
receiving a fourth multiple-input and multiple-output wireless signal using a fourth antenna, wherein the fourth antenna is coupled to the receiver chip, and wherein the fourth antenna is a global position system antenna; and
routing the fourth multiple-input and multiple-output wireless signal through a second secondary receiver on the receiver chip to obtain a quaternary receive inphase/quadrature signal, wherein the first primary receiver, the second primary receiver, the first secondary receiver and the second secondary receiver are configured for both carrier aggregation operation and multiple-input and multiple-output operation.

13. The method of claim 12, further comprising obtaining a receive signal from the primary receive inphase/quadrature signal, the secondary receive inphase/quadrature signal, the tertiary receive inphase/quadrature signal and the quaternary receive inphase/quadrature signal.

14. The method of claim 13, wherein the primary receive inphase/quadrature signal, the secondary receive inphase/quadrature signal, the tertiary receive inphase/quadrature signal and the quaternary receive inphase/quadrature signal are passed through a baseband digital modem to obtain the receive signal.

15. The method of claim 12, wherein the method is performed by a wireless communication device.

16. The method of claim 15, wherein the wireless communication device comprises:
a first multiple-input and multiple-output carrier aggregation receiver reuse architecture that comprises:
the first antenna;
the second antenna; and
the transceiver chip, wherein the first multiple-input and multiple-output carrier aggregation receiver reuse architecture reuses a first carrier aggregation receiver path; and
a second multiple-input and multiple-output carrier aggregation receiver reuse architecture that comprises:
the third antenna;
the fourth antenna; and
the receiver chip, wherein the second multiple-input and multiple-output carrier aggregation receiver reuse architecture reuses a second carrier aggregation receiver path.

17. The method of claim 16, wherein the wireless communication device does not require a power splitter, an external low noise amplifier or die-to-die signal routing.

18. The method of claim 16, wherein the transceiver chip comprises:
a transmitter,
wherein each receiver comprises multiple low noise amplifiers.

19. The method of claim 18, wherein a first routing is used from the first antenna through the first primary receiver to obtain a primary receive inphase/quadrature signal, wherein a second routing is used from the second antenna through the first secondary receiver to obtain a secondary receive inphase/quadrature signal, wherein a third routing is used from the third antenna through the second primary receiver to obtain a tertiary receive inphase/quadrature signal, and wherein a fourth routing is used from the fourth antenna through the second secondary receiver to obtain a quaternary receive inphase/quadrature signal.

20. The method of claim 19, wherein the first routing passes through a duplexer and through a low noise amplifier on the first primary receiver.

21. The method of claim 19, wherein the second routing passes through a surface acoustic wave filter and through a low noise amplifier on the first secondary receiver.

22. The method of claim 19, wherein the third routing passes through a surface acoustic wave filter and through a low noise amplifier on the second primary receiver.

23. The method of claim 19, wherein the fourth routing passes through a surface acoustic wave filter and through a low noise amplifier on the second secondary receiver.

24. The method of claim 16, wherein only two synthesizers are running on the wireless communication device when the wireless communication device is receiving multiple-input and multiple-output communications.

25. The method of claim 24, wherein the first primary receiver comprises a first synthesizer, wherein the second primary receiver comprises a second synthesizer, wherein the first synthesizer is shared with the first secondary receiver, and wherein the second synthesizer is shared with the second secondary receiver.

26. The method of claim 16, wherein the wireless communication device is configured to receive 4Rx multiple-input and multiple-output communications using the first antenna, the second antenna, the third antenna and the fourth antenna.

27. An apparatus for receiving a multiple-input and multiple-output wireless signal, comprising:
   means for receiving a first multiple-input and multiple-output wireless signal using a first antenna, wherein the first antenna is coupled to a transceiver chip;
   means for routing the first multiple-input and multiple-output wireless signal through a first primary receiver on the transceiver chip to obtain a primary receive inphase/quadrature signal;
   means for receiving a second multiple-input and multiple-output wireless signal using a second antenna, wherein the second antenna is coupled to the transceiver chip, and wherein the second antenna is a wireless local area network antenna;
   means for routing the second multiple-input and multiple-output wireless signal through a first secondary receiver on the transceiver chip to obtain a secondary receive inphase/quadrature signal;
   means for receiving a third multiple-input and multiple-output wireless signal using a third antenna, wherein the third antenna is coupled to a receiver chip;
   means for routing the third multiple-input and multiple-output wireless signal through a second primary receiver on the receiver chip to obtain a tertiary receive inphase/quadrature signal;
   means for receiving a fourth multiple-input and multiple-output wireless signal using a fourth antenna, wherein the fourth antenna is coupled to the receiver chip, and wherein the fourth antenna is a global position system antenna; and
   means for routing the fourth multiple-input and multiple-output wireless signal through a second secondary receiver on the receiver chip to obtain a quaternary receive inphase/quadrature signal, wherein the first primary receiver, the second primary receiver, the first secondary receiver and the second secondary receiver are configured for both carrier aggregation operation and multiple-input and multiple-output operation.

28. The apparatus of claim 27, further comprising obtaining a receive signal from the primary receive inphase/quadrature signal, the secondary receive inphase/quadrature signal, the tertiary receive inphase/quadrature signal and the quaternary receive inphase/quadrature signal.

29. The apparatus of claim 28, wherein the primary receive inphase/quadrature signal, the secondary receive inphase/quadrature signal, the tertiary receive inphase/quadrature signal and the quaternary receive inphase/quadrature signal are passed through a baseband digital modem to obtain the receive signal.

30. The apparatus of claim 27, wherein the apparatus is a wireless communication device.

31. The apparatus of claim 30, wherein the wireless communication device comprises:
   a first multiple-input and multiple-output carrier aggregation receiver reuse architecture that comprises:
      the first antenna;
      the second antenna; and
      the transceiver chip, wherein the first multiple-input and multiple-output carrier aggregation receiver reuse architecture reuses a first carrier aggregation receiver path; and
   a second multiple-input and multiple-output carrier aggregation receiver reuse architecture that comprises:
      the third antenna;
      the fourth antenna; and
      the receiver chip, wherein the second multiple-input and multiple-output carrier aggregation receiver reuse architecture reuses a second carrier aggregation receiver path.

* * * * *